(12) United States Patent
Suzuki et al.

(10) Patent No.: US 11,383,157 B2
(45) Date of Patent: Jul. 12, 2022

(54) SERVER APPARATUS, BASE STATION, AND TERMINAL APPARATUS AS WELL AS COMMUNICATION SYSTEM

(71) Applicant: SONY CORPORATION, Tokyo (JP)

(72) Inventors: Hideyuki Suzuki, Tokyo (JP); Takuya Iwai, Tokyo (JP); Junji Kato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/978,168

(22) PCT Filed: Feb. 26, 2019

(86) PCT No.: PCT/JP2019/007170
§ 371 (c)(1),
(2) Date: Sep. 3, 2020

(87) PCT Pub. No.: WO2019/176519
PCT Pub. Date: Sep. 19, 2019

(65) Prior Publication Data
US 2021/0362041 A1    Nov. 25, 2021

(30) Foreign Application Priority Data
Mar. 12, 2018 (JP) .............................. JP2018-043995

(51) Int. Cl.
*A63F 13/216* (2014.01)
*A63F 13/327* (2014.01)
(Continued)

(52) U.S. Cl.
CPC .......... *A63F 13/216* (2014.09); *A63F 13/327* (2014.09); *A63F 13/35* (2014.09); *A63F 13/655* (2014.09); *G06T 19/006* (2013.01)

(58) Field of Classification Search
None
See application file for complete search history.

(56) References Cited

U.S. PATENT DOCUMENTS

| 9,633,547 B2 * | 4/2017 | Farrand ................. G08B 13/02 |
| 2008/0076579 A1 | 3/2008 | Tabata |

(Continued)

FOREIGN PATENT DOCUMENTS

| CN | 103069892 A | 4/2013 |
| CN | 103954928 A | 7/2014 |

(Continued)

OTHER PUBLICATIONS

International Search Report and Written Opinion of PCT Application No. PCT/JP2019/007170, dated Apr. 9, 2019, 11 pages of ISRWO.

(Continued)

*Primary Examiner* — Ronald Laneau
(74) *Attorney, Agent, or Firm* — Chip Law Group

(57) ABSTRACT

The present disclosure relates to a server apparatus, a base station, and a terminal apparatus as well as a communication system that make it possible to implement stabilized communication against a fluctuation of a communication environment in a wireless LAN by switching a base station taking an event into consideration. An application server delivers information relating to an event, which differs for each base station depending upon an installed position, to a terminal apparatus through a base station together with base station information including communication quality and functions of the base station. The terminal apparatus selects a base station with which connection should be established, on the basis of the event information and the base station information and switches the connection. The present disclosure can be applied to a communication system in a wireless LAN.

20 Claims, 17 Drawing Sheets

(51) Int. Cl.
*A63F 13/35* (2014.01)
*A63F 13/655* (2014.01)
*G06T 19/00* (2011.01)

(56) References Cited

U.S. PATENT DOCUMENTS

| | | | |
|---|---|---|---|
| 2010/0015979 | A1 | 1/2010 | Kono |
| 2012/0045005 | A1 | 2/2012 | Kim et al. |
| 2013/0165069 | A1* | 6/2013 | Nitta ................ H04W 4/02 455/404.2 |
| 2014/0022919 | A1 | 1/2014 | Dwivedi et al. |
| 2017/0142649 | A1 | 5/2017 | El-Moussa et al. |
| 2019/0274081 | A1* | 9/2019 | Furuichi ............... H04W 36/08 |

FOREIGN PATENT DOCUMENTS

| | | |
|---|---|---|
| CN | 105338604 A | 2/2016 |
| CN | 105376813 A | 3/2016 |
| EP | 1902763 A1 | 3/2008 |
| EP | 2852229 A2 | 3/2015 |
| JP | 2007-150709 A | 6/2007 |
| JP | 2008-073265 A | 4/2008 |
| JP | 2013-009130 A | 1/2013 |
| JP | 5176237 B2 | 4/2013 |
| JP | 2013-535935 A | 9/2013 |
| KR | 10-2008-0078021 A | 8/2008 |
| KR | 10-2012-0016985 A | 2/2012 |
| WO | 2007/060994 A1 | 5/2007 |
| WO | 2012/023743 A2 | 2/2012 |

OTHER PUBLICATIONS

Office Action for CN Patent Application No. 201980017390.4, dated Sep. 3, 2021, 10 pages of Office Action and 13 pages of English Translation.

* cited by examiner

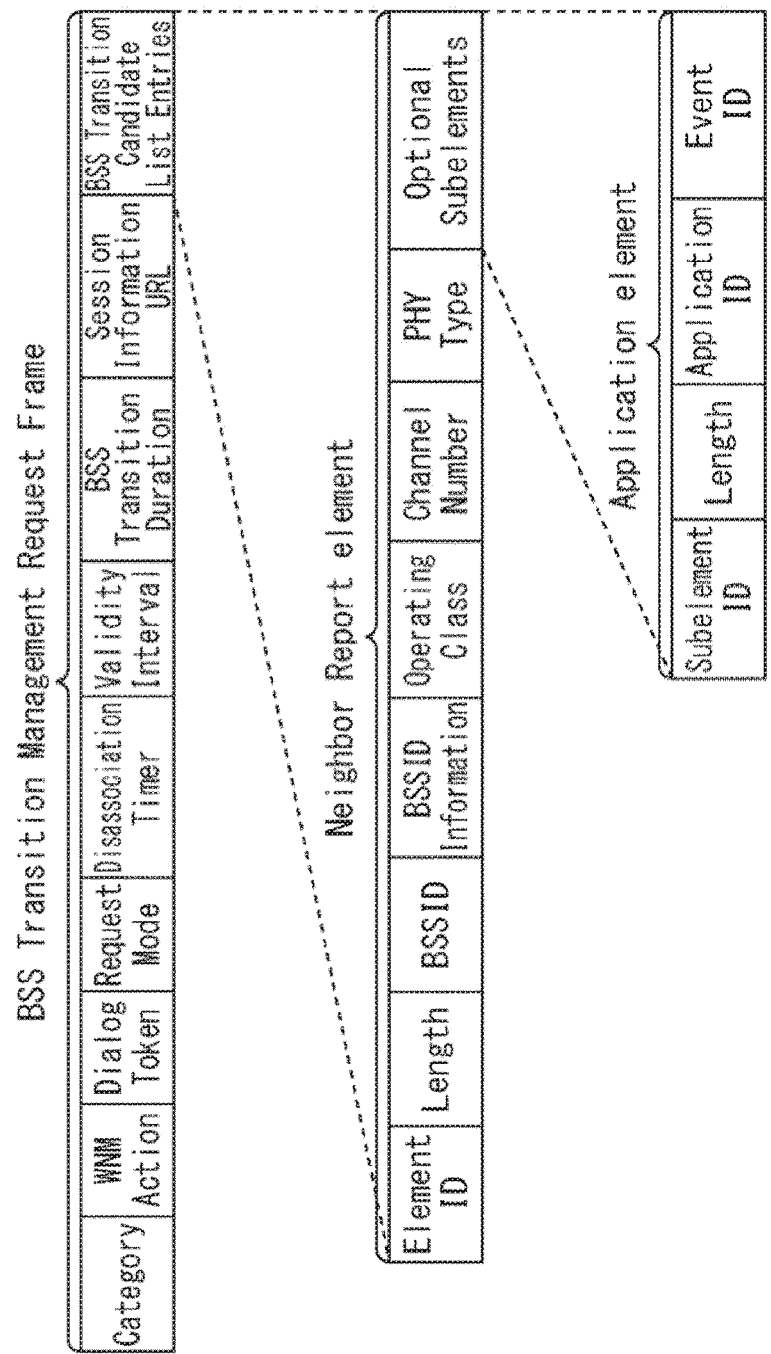
F I G . 1 2

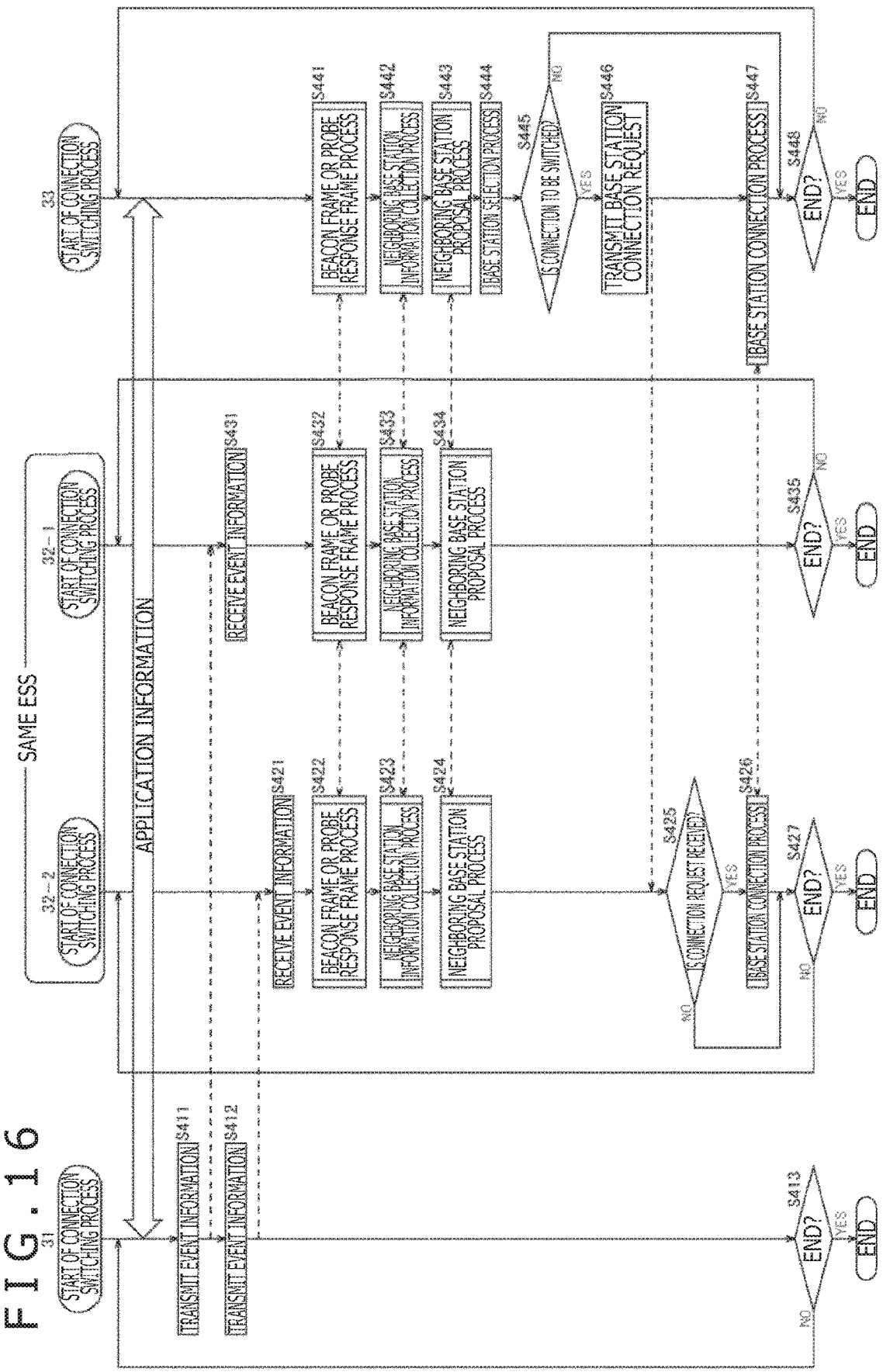

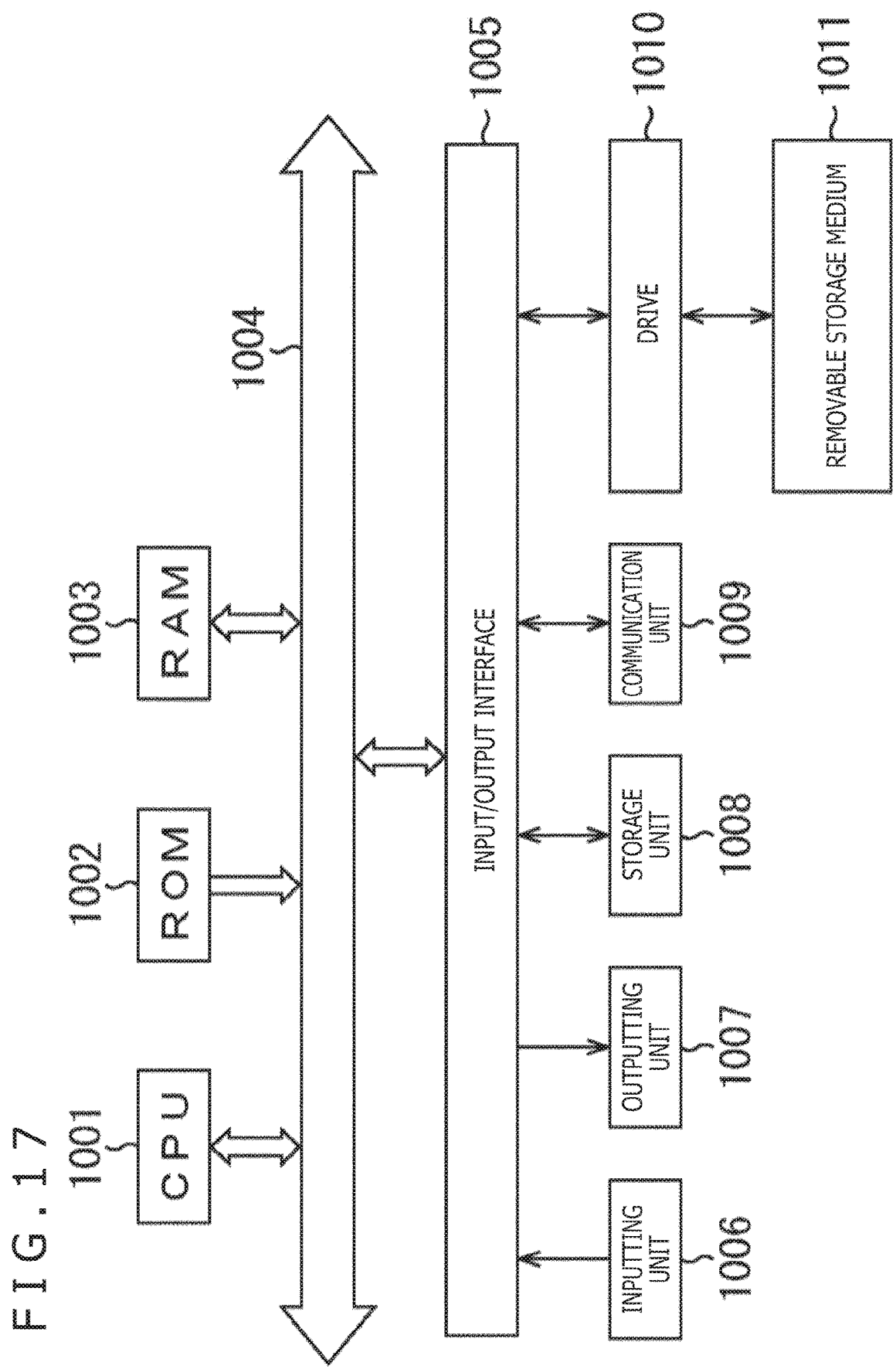

SERVER APPARATUS, BASE STATION, AND TERMINAL APPARATUS AS WELL AS COMMUNICATION SYSTEM

CROSS REFERENCE TO RELATED APPLICATIONS

This application is a U.S. National Phase of International Patent Application No. PCT/JP2019/007170 filed on Feb. 26, 2019, which claims priority benefit of Japanese Patent Application No. JP 2018-043995 filed in the Japan Patent Office Mar. 12, 2018. Each of the above-referenced applications is hereby incorporated herein by reference in its entirety.

TECHNICAL FIELD

The present disclosure relates to a server apparatus, a base station, and a terminal apparatus as well as a communication system, and more particularly to a server apparatus, a base station, and a terminal apparatus as well as a communication system that make it possible to implement stabilized communication against a fluctuation of a communication environment in wireless LAN (Local Area Network) communication caused by a movement of a user who owns a wireless LAN terminal.

BACKGROUND ART

In recent years, a wearable terminal for being worn by a user has a wireless LAN function incorporated therein. This makes it possible for the wearable terminal to execute an application program that uses information obtained through communication with a server on the basis of position information for superposition and synthesis of a virtual image of CG (Computer Graphics) or the like with an image in a real space and AR (Augmented Reality, augmented reality) display of a resulting image. A terminal apparatus such as a wearable terminal in which a wireless LAN function is incorporated is hereinafter simply referred to as a wireless LAN terminal.

In such a case as just described, as the user moves, it is necessary for the wireless LAN terminal to select a wireless LAN base station that is to be made an appropriate roaming destination according to a service situation of an application program of an upper layer and switch the wireless LAN base station to be made a connection partner.

When the wireless LAN terminal is switched, not a little connection overhead occurs because a process necessary for switching of the wireless LAN base station is executed (a period of time necessary for switching occurs).

More particularly, in order to switch the wireless LAN base station, required is such a series of process that a process for disconnecting communication with a wireless LAN base station at present is executed firstly and a process for Scan (search) of neighboring wireless LAN base stations is executed secondly, whereafter a process for establishing connection (by 4-Way Handshake or the like) to a searched out wireless LAN base station is executed thirdly.

As a result, since periods of times necessary for the individual processes occur, when the wireless LAN base station is switched, a connection overhead occurs. Therefore, during occurrence of an event by an application program, it is desirable to suppress switching of the wireless LAN base station.

In the past, a technique of switching a wireless LAN base station to be made a connection destination on the basis of communication quality of a wireless layer such as a received signal strength (RSSI) has often been used. However, even if the RSSI is high, the higher order application program may not necessarily be able to ensure high communication quality, and if the wireless LAN base station is switched immoderately only by the RSSI, then an unnecessary connection overhead occurs, resulting in the possibility that the communication quality may be degraded.

Therefore, a technology for switching a wireless LAN base station on the basis of communication quality (TCP/IP communication quality) of an application program has been proposed (refer to PTL 1).

Further, a technology for selecting a wireless LAN base station has been proposed (refer to PTL 2). According to the technology, combinations of a type or a name of an application program and a communication quality level are retained as a transmission quality database. The type or the name of an application program that is currently being executed is inputted to refer to query the communication quality database and select identification information of a wireless LAN base station whose communication quality level is optimum (highest) for the application program during execution processing to thereby select the wireless LAN base station.

CITATION LIST

Patent Literature

[PTL 1]
 JP 2013-009130A
[PTL 2]
 Japanese Patent No. 5176237

SUMMARY

Technical Problems

However, in the technology of PTL 1, in a case of selecting a wireless LAN base station, only a wireless LAN base station from which a signal having the highest RSSI is received is selected from among wireless LAN base stations except the wireless LAN base station that is in a currently connected state. Therefore, when connection is established with the wireless LAN base station, high signal quality may not necessarily be ensured for execution of a desired application program.

Meanwhile, in the technology of PTL 2, it is supposed that the radio wave strength of a wireless LAN base station in a connected state and the signal quality level (packet loss rate, jitters, throughput or the like) for each application program are measured on a wireless LAN terminal and are recorded into the communication quality database. Therefore, an optimum wireless LAN base station that matches a signal quality level for execution of the application program can be selected.

However, when a wireless LAN terminal is connected in advance with wireless LAN base stations with which it may possibly be connected and, in this state, the application program is executed to measure the signal quality level, if the signal quality level is not coincident with any state recorded in the database, the wireless LAN terminal cannot decide an optimum wireless LAN base station.

Therefore, at a place the user visits for the first time or a like place, it is unavoidable to decide a wireless LAN base station only from information of a radio wave strength or the like.

Further, in order to update the information of the signal quality database to the latest situation, it is necessary to periodically establish connection to neighboring terminals also during execution of an application program and to periodically update the communication quality database. This gives rise to such an influence that communication interruption or the like occurs during connection to another wireless LAN base station.

The present disclosure has been made in view of such a situation as described above and makes it possible to implement stabilized communication against a fluctuation of the communication environment in wireless LAN communication especially from a movement of a user who owns a wireless LAN terminal.

Solution to Problems

A server apparatus of a first aspect of the present disclosure is a server apparatus including an application information supplying unit configured to supply application information relating to an application program to be executed by a terminal apparatus to the terminal apparatus through a base station whose communication with the terminal apparatus is established whose communication with the terminal apparatus is established, and an event information supplying unit configured to supply event information, which is information relating to an event that is implemented by execution, by the terminal apparatus, of the application program supplied to the terminal apparatus through the base station installed at a predetermined position, to the base station installed at the predetermined position.

In the first aspect of the present disclosure, application information relating to an application program to be executed by the terminal apparatus is supplied to the terminal apparatus through the base station whose communication with the terminal apparatus is established. Then, event information, which is information relating to an event that is implemented by execution, by the terminal apparatus of the application program supplied to the terminal apparatus through the base station installed at the predetermined position, is supplied to the base station installed at the predetermined position.

A base station of a second aspect of the present disclosure is a base station including a reception unit configured to receive, from a server apparatus, application information relating to an application program to be executed by a terminal apparatus and event information that is information relating to an event that is implemented by execution of the application program by the terminal apparatus and a transmission unit configured to transmit the application information, the event information, and base station information that is information relating to communication capability of the base station itself to the terminal apparatus.

In the second aspect of the present disclosure, application information relating to an application program to be executed by the terminal apparatus and event information that is information relating to an event that is implemented by execution of the application program by the terminal apparatus are received from the server apparatus. Then, the application information, the event information, and the base station information that is information relating to communication capability of the base station itself are transmitted to the terminal apparatus.

A terminal apparatus of a third aspect of the present disclosure is a terminal apparatus including a reception unit configured to receive information supplied to the terminal apparatus from a server apparatus through a base station, the information including application information relating to an application program to be executed by the terminal apparatus itself, event information that is information relating to an event that is implemented by execution of the application program, and base station information that is information relating to communication capability of the base station, and a selection unit configured to select a base station with which connection should be established next on the basis of the event information and the base station information.

In the third aspect of the present disclosure, information supplied from the server apparatus through the base station and including application information relating to an application program to be executed by the terminal apparatus itself, event information that is information relating to an event that is implemented by execution of the application program, and base station information that is information relating to communication capability of the base station is received. Then, a base station with which connection should be established next is selected on the basis of the event information and the base station information.

A communication system of a fourth aspect of the present disclosure is a communication system including a server apparatus configured to supply application information relating to an application program to a terminal apparatus through a base station installed at a predetermined position, the base station configured to receive the application information from the server apparatus and supply the application information to the terminal apparatus, and the terminal apparatus configured to execute the application program on the basis of the application information supplied from the base station. The server apparatus includes an application information supplying unit configured to supply the application information to the terminal apparatus through the base station and an event information supplying unit configured to supply event information, which is information relating to an event implemented by execution of the application program by the terminal apparatus and is supplied to the terminal apparatus through the base station, to the base station. The base station includes a base station reception unit configured to receive the application information and the event information supplied from the server apparatus and a base station transmission unit configured to transmit the application information, the event information, and base station information that is information relating to communication capability of the base station itself to the terminal apparatus. The terminal apparatus includes a terminal reception unit configured to receive the application information, the event information, and the base station information supplied to the terminal apparatus from the base station and a selection unit configured to select a base station to which communication is to be established next on the basis of the event information and the base station information.

In the fourth aspect of the present disclosure, the communication system includes the server apparatus that supplies application information relating to an application program to the terminal apparatus through the base station installed at the predetermined position, the base station that receives the application information from the server apparatus and supplies the application information to the terminal apparatus, and the terminal apparatus that executes the application program on the basis of the application information supplied from the base station. The server apparatus supplies the application information to the terminal apparatus through the base station. Event information, which is information relating to an event implemented by execution of the application program by the terminal apparatus and is supplied through the base station, is supplied to the base station. The base station receives the application information and the event information supplied from the server apparatus and transmits the application information, the event information, and the base station information that is information relating to communication capability of the base station itself to the terminal apparatus. The terminal apparatus receives the application information, the event information, and the base station information supplied from the base station and selects a base station to which communication is to be established next on the basis of the event information and the base station information.

Advantageous Effect of Invention

According to one aspect of the present disclosure, it is possible to implement stabilized communication against a fluctuation of a communication environment in wireless LAN communication especially arising from a movement of a user who owns a wireless LAN terminal.

BRIEF DESCRIPTION OF DRAWINGS

FIG. 12 is a view illustrating an example of a configuration of a BSS Transition Management Request Frame.

FIG. 16 is a flow chart illustrating a connection switching process in which the Beacon frame, the Probe Response Frame, the Neighbor Report element, and the BSS Transition Management Request Frame are used in combination.

FIG. 17 is a view illustrating an example of a configuration of a personal computer for universal use.

DESCRIPTION OF EMBODIMENTS

In the following, preferred embodiments of the present disclosure are described with reference to the accompanying drawings. It is to be noted that components having substantially same functional configurations are denoted by the same reference signs and overlapping description of them is omitted.

In the following, modes for carrying out the present technology is described. The description is given in the following order.

1. First Embodiment
2. Second Embodiment
3. Third Embodiment
4. Fourth Embodiment
5. Fifth Embodiment
6. Example of Execution by Software 1. First Embodiment An example of a configuration of a communication system to which a technology of the present disclosure is applied is described with reference to FIG. 1.

Figure 1:
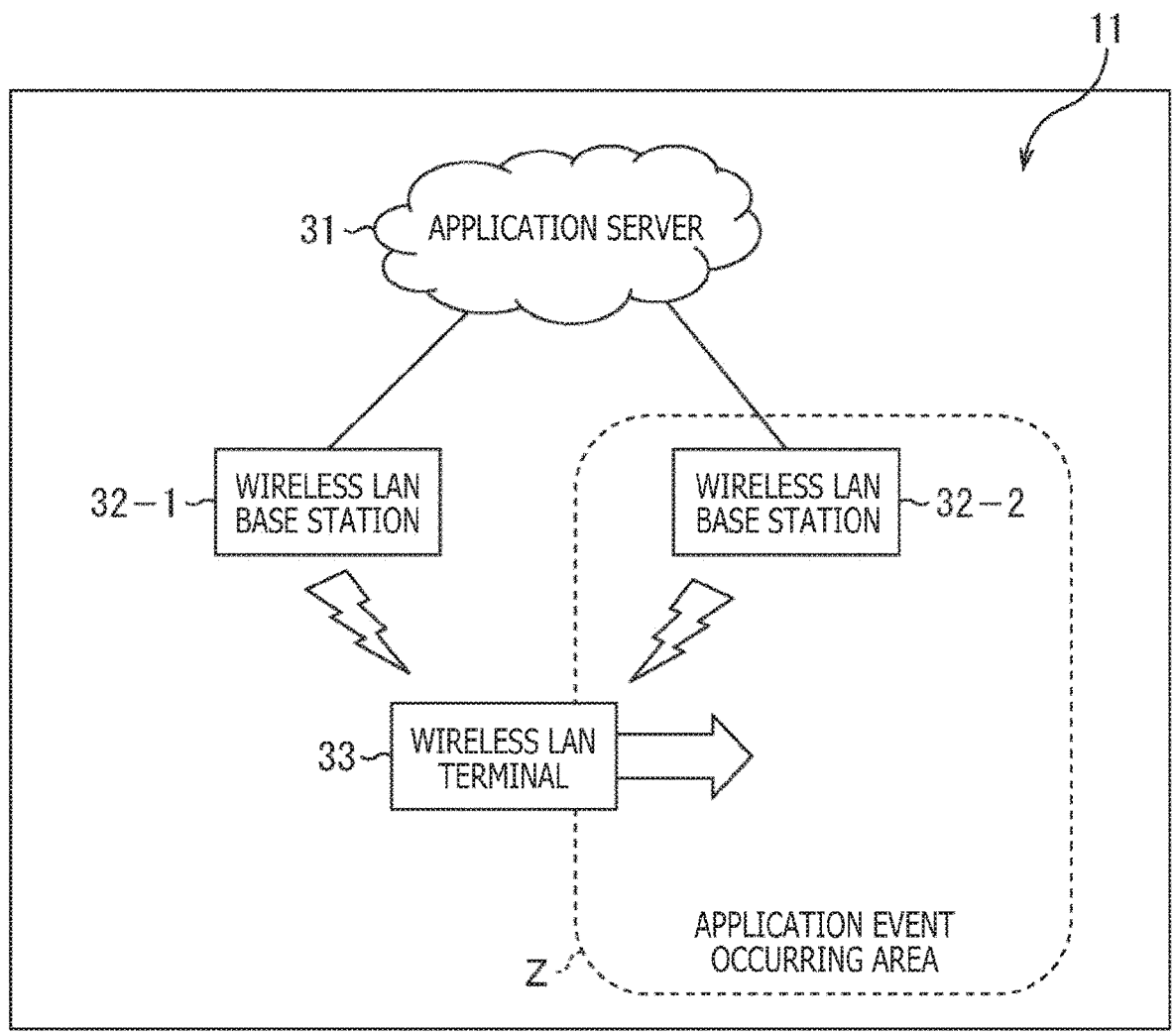
FIG. 1 is a view illustrating an example of a configuration of a communication system of the present disclosure.

A communication system 11 of FIG. 1 includes an application server 31, wireless LAN base stations 32-1 and 32-2, and a wireless LAN terminal 33. It is to be noted that, in the case where there is no necessity to specifically distinguish the wireless LAN base stations 32-1 and 32-2 from each other, each of them is simply referred to as wireless LAN base station 32.

In FIG. 1, the application server 31 cooperates with the wireless LAN terminal 33 through the wireless LAN base station 32-1 or 32-2 to manage data and control information (hereinafter also referred to as application information) necessary to allow an application program, which is to be operated on the wireless LAN terminal 33, to be executed. The application server 31 delivers the application information to the wireless LAN terminal 33.

Further, the application server 31 manages information relating to an event to be provided in a predetermined physical space (specific position in a predetermined letter space). The application server 31 notifies the wireless LAN terminal 33 of information indicating of from which one of the wireless LAN base stations 32 installed in the predetermined physical space the event is to be provided.

The "information related to an event to be provided in the predetermined physical space" is information for identifying an event occurring, for example, in an AR (augmented reality) position information game or the like when the game is implemented by execution of an application program.

Here, the event occurs according to such a story in a game that operates by execution of an application program that, for example, if a virtual image or the like of a game character or an item goes to a specific place in a town, then it is displayed in a superposed relation with an image in a real space and fights a game character represented by a virtual image or acquires an item represented by a virtual image within the displayed image space.

More particularly, the "information related to an event to be provided in the predetermined physical space" is, for example, an event scene name or the like in a game scenario indicative of an event that occurs while the game progresses.

It is to be noted that the "information related to an event to be provided in the predetermined physical space" is also simply referred to as event information in the following.

The wireless LAN base station 32 transfers application information required by an application program on the wireless LAN terminal 33 from the application server 31 to the wireless LAN terminal 33.

Further, the wireless LAN base station 32 acquires information (event information) relating to an event to be provided in a predetermined physical space in the neighborhood of the own apparatus from the application server 31. The wireless LAN base station 32 transmits the event information to neighboring wireless LAN terminals 33 together with base station information including information of the communication quality of the wireless LAN base station 32 through a wireless LAN.

The communication quality is a communication processing load to a base station that increases in response to increase of the number of apparatus connected, a throughput of a backhaul with which the wireless LAN base station 32 is connected, in addition to wireless communication qualities such as the reception signal intensity of radio waves (RSSI: Received Signal Strength Indicator) and the signal to noise ratio (SNR: Signal-to-Noise Ratio).

More particularly, the base station information of the wireless LAN base station 32 is information relating to communication quality of the wireless LAN base station 32 and the wireless function of the wireless LAN base station 32. Further, the base station information is transmitted to neighboring wireless LAN terminals 33 together with event information provided by the wireless LAN base station 32 (information for identifying an event scene name or the like in a game scenario).

Here, the communication quality of the wireless LAN base station 32 is, for example, the RSSI, the SNR, the load information, and the throughput information of the backhaul network, as described above.

Further, the information relating to wireless functions of the wireless LAN base station 32 is information of an identifier for identifying the wireless LAN base station 32, a corresponding wireless band (2.4 GHz, 5 Hz, 60 GHz or the like), an operation channel in each wireless band, and supported wireless LAN security functions (encryption and authentication algorithms).

Note that it is assumed that, in FIG. 1, the wireless LAN base stations 32-1 and 32-2 are provided in the same ESS (Extended Service Set).

The wireless LAN terminal 33 acquires application information from the application server 31 through a wireless LAN base station 32 with which communication is established and runs the application program in a predetermined physical space on the basis of the application information.

Further, the wireless LAN terminal 33 contacts wireless LAN base stations 32 for and acquires base station information of the wireless LAN base stations 32 necessary for selecting a wireless LAN base station 32 with which less switching of the wireless LAN base station 32 is required, in order to run the application program at a specific position in the predetermined physical space. Then, the wireless LAN terminal 33 selects a wireless LAN base station 32 on the basis of the acquired base station information such that less switching is required and switches the connection as occasion demands.

It is to be noted that, in FIG. 1, information of an event that occurs through execution of an application program in an application event occurring area Z by the wireless LAN base station 32-2 is sent out as "information relating to an event to be provided in a predetermined physical space" (event information).

Further, FIG. 1 represents that the wireless LAN terminal 33 is in a state in which communication is established with the wireless LAN base station 32-1 and a user who holds the wireless LAN terminal 33 moves in a direction indicated by an arrow mark in FIG. 1 until it enters the application event occurring area Z. Along with this, the wireless LAN terminal 33 switches the communication to that with the wireless LAN base station 32-2 at an optimum timing on the basis of the position information of the own apparatus and the base station information of the wireless LAN base stations.

Furthermore, FIG. 1 depicts a configuration in which the wireless LAN base stations 32-1 and 32-2 are provided as the wireless LAN base stations 32. However, a greater number of wireless LAN base stations 32 may be provided.

<Example of Configuration of Application Server>

Now, an example of a configuration of the application server 31 is described with reference to FIG. 2.

The application server 31 includes a control unit 40, a communication unit 41, an event information transmission processing unit 42, and an application information transmission processing unit 43.

The control unit 40 includes a processor, a memory and so forth and controls overall operation of the application server 31.

The communication unit 41 is controlled by the control unit 40 and communicates with another wireless LAN base station 32 by a predetermined wired channel (or a wireless channel) in accordance with a protocol prescribed by the IEEE 802.11 specification. It is to be noted that the following description of the present embodiment is given assuming that the communication unit 41 uses a wired network in communication with the wireless LAN base stations 32.

The event information transmission processing unit 42 transmits, as information relating to an event to be provided in a predetermined physical space, event information indicative of from which wireless LAN base station 32 installed in the predetermined physical space any event is to be provided to the wireless LAN terminal 33 through the wireless LAN base station 32.

The application information transmission processing unit 43 transmits application information for executing an application program to be executed in the wireless LAN terminal 33 to the wireless LAN terminal 33 through the wireless LAN base station 32.

It is to be noted that the application server 31 may include a computer for universal use that is configured solely or may be implemented by cloud computing.

<Example of Configuration of Wireless LAN Base Station>

Now, an example of a configuration of the wireless LAN base station 32 is described with reference to FIG. 3.

The wireless LAN base station 32 includes a control unit 50, a wireless communication unit 51, a wired communication unit 52, an own base station information processing unit 53, and an antenna 54.

The control unit 50 includes a processor, a memory and so forth and controls overall operation of the wireless LAN base station 32.

The wireless communication unit 51 is controlled by the control unit 50 and communicates with a wireless LAN terminal 33 by a predetermined operation channel in a predetermined wireless band (2.4 GHz, 5 GHz, 60 GHz or the like) through the antenna 54 in accordance with a protocol prescribed by the IEEE 802.11 specification.

The wired communication unit 52 is controlled by the control unit 50 and communicates with another wireless LAN base station 32 by a predetermined wired channel in accordance with a protocol prescribed by a predetermined specification.

The own base station information processing unit 53 controls the wireless communication unit 51 to acquire application information from the application server 31 and transmit the application information to neighboring wireless LAN terminals 33. Further, the own base station information processing unit 53 acquires information (event information)

relating to an event to be provided at a specific position in a predetermined physical space around the own apparatus. Then, the own base station information processing unit 53 transmits the acquired event information as base station information of the wireless LAN base station 32 together with communication quality of the wireless LAN base station 32 to the neighboring wireless LAN terminals 33 through the wireless communication unit 51.

<Example of Configuration of Wireless LAN Terminal>

Now, an example of a configuration of the wireless LAN terminal 33 is described with reference to FIG. 4.

The wireless LAN terminal 33 includes a control unit 70, a wireless communication unit 71, a base station search processing unit 72, a base station connection processing unit 73, a GPS 74, a base station selection decision processing unit 75, an application unit 76, an outputting unit 77, and an antenna 78.

The control unit 70 includes a processor, a memory and so forth and controls overall operation of the wireless LAN terminal 33.

The wireless communication unit 71 is controlled by the control unit 70 and communicates with a wireless LAN base station 32 by a predetermined operation channel in a predetermined wireless band (2.4 GHz, 5 GHz, 60 GHz or the like) through the antenna 78 in accordance with a protocol prescribed by the IEEE 802.11 specification.

The base station search processing unit 72 searches for neighboring wireless LAN base stations 32 on the basis of base station information supplied through the wireless LAN base stations 32 and supplies a result of the search to the base station selection decision processing unit 74.

The base station connection processing unit 73 executes a connection process with respect to a selected wireless LAN base station 32.

The GPS (Global Positioning System) 74 acquires signals from satellites not depicted to determine the position of the own apparatus as position information on the earth and supplies the position information to the base station selection decision processing unit 74. It is to be noted that, only if the position of the own apparatus can be determined, any component other than the GPS 74 may be used.

The base station selection decision processing unit 75 selects a wireless LAN base station 32 with which connection should be established, on the basis of a search result for wireless LAN base stations 32 supplied from the base station search processing unit 72, position information of the own apparatus, and event information. The base station selection decision processing unit 75 outputs a result of the selection to the base station connection processing unit 73.

The application unit 76 executes an application program on the basis of application information supplied through a wireless LAN base station 32 to which connection is established.

The outputting unit 77 includes a display that displays an image and a speaker that outputs sound, which are generated by execution of an application program by the application unit 76. Further, in the case where the outputting unit 77 is the display, it may include, for example, a touch panel or a like device. In this case, the outputting unit 77 accepts an operation input of a user and outputs an operation signal according to the operation input to the application unit 76. At this time, the application unit 76 executes a process according to the operation signal by the application program.

<Connection Between Wireless LAN Base Station and Wireless LAN Terminal Using Beacon Frame>

The application server 31 supplies application information to a wireless LAN terminal 33 through a wireless LAN base station 32.

Further, the application server 31 transmits event information occurring around places in which wireless LAN base stations 32 are arranged individually to the wireless LAN base stations 32. At this time, each wireless LAN base station 32 is configured such that it is possible to issue a notification of the event information to neighboring wireless LAN terminals 33 (transmits the event information to wireless LAN terminals 33 by using a management frame that can be transferred in a state in which no communication is established). Here, the event information is information that differs depending upon the position at which each wireless LAN base station 32 is arranged or a progress situation of a game.

It is to be noted that a plurality of wireless LAN base stations 32 may be installed for the object of load distribution to allow a large number of users' wireless LAN terminals 33 to be connected at the same place. In this case, the plurality of wireless LAN base stations 32 existing at a place at which an event occurs transmits the same event information.

The wireless LAN terminal 33 runs an application program and periodically acquires base station information from neighboring wireless LAN base stations 32 first. The base station information is periodically transmitted using, for example, a Beacon Frame prescribed by the IEEE 802.11 specification. In particular, the wireless LAN base station 32 places event information into an extension region in the Beacon Frame and transmits the Beacon Frame to neighboring wireless LAN terminals 33.

Here, the Beacon Frame is used in Passive Scan when neighboring wireless LAN base stations 32 are searched for by the wireless LAN terminal 33. In particular, the wireless LAN base stations 32 send out base station information of them as a Beacon Frame, for example, at predetermined intervals of time. The wireless LAN terminal 33 receives a Beacon Frame sent out from each wireless LAN base station 32 at predetermined intervals of time to acquire base statin information included in the Beacon Frame. Then, the wireless LAN terminal 33 selects a wireless LAN base station 32 with which connection should be established, on the basis of the acquired base station information, and requests the wireless LAN base station 32 for connection.

Thus, the wireless LAN base station 32 in the present disclosure transmits a Beacon Frame with event information included in the extension region therein to the wireless LAN terminal 33. Consequently, the wireless LAN terminal 33 selects a wireless LAN base station 32 with which connection should be established, under a condition taking event information into account together with base station information originally included in the Beacon Frame of the IEEE 802.11 specification. Since the wireless LAN base station 32 with which connection should be established is selected in such a manner, the wireless LAN terminal 33 implements stabilized communication by switching the connection of the wireless LAN base station 32 according to the base station information and an execution situation of an event.

Figure 5:
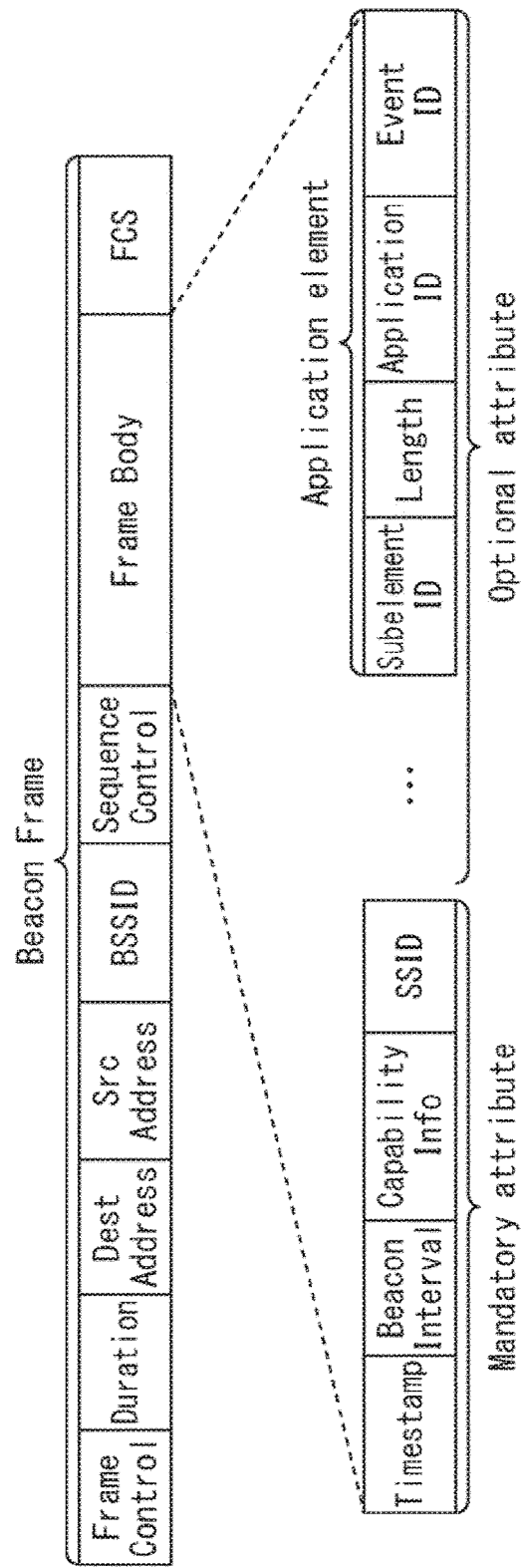
FIG. 5 is a view illustrating an example of a configuration of a Beacon Frame.

The Beacon Frame has, for example, such a configuration as depicted in the upper stage of FIG. 5.

In particular, the Beacon Frame includes Frame Control, Duration, Dest Address, Src Address, BSSID, Sequence Control, Frame Body, and FC.

In the Frame Control, information indicative of the type of the frame is placed.

In the Duration, information indicative of a reservation time period till completion of frame transmission is placed.

In the Dest Address, the address of a transmission destination of the frame is placed.

In the Src Address, the address of the transmission source of the frame is placed.

In the BSS (Basic Service Set) ID, the ID for identifying a cell configured by a wireless LAN terminal 33 that communicates using a same wireless channel in a predetermined region is placed.

In the Sequence Control, information regarding an indication of a division position of the frame and a sequence number is placed.

The Frame Body is the body of data placed in the Beacon Frame and includes Mandatory attribute and Optional attribute as indicated in the lower stage of FIG. 5.

Further, the Mandatory attribute in the Frame Body is essential attribute information and includes Timestamp, Beacon Interval, Capability Info, and SSID.

In the Timestamp, time synchronization information used for synchronization between a wireless LAN base station 32 and a wireless LAN terminal 33 is placed.

In the Beacon Interval, information of a time interval after which the Beacon Frame is to be sent out is placed.

In the Capability Info, capability information of the wireless LAN base station 32 is placed and base station information is included in part of the capability information. In particular, the base station information includes communication quality of a wireless LAN base station (RSSI, SNR, AP load information, and throughput information of a backhaul network) and information relating to wireless functions of the wireless LAN base station (wireless LAN base station identifier, corresponding wireless band (2.4 GHz, 5 GHz, 60 GHz or the like), operation channels in wireless bands, and supported wireless LAN security functions (encryption and authentication algorithms)) described hereinabove.

In the SSID, the ID that is the Service Set ID and that identifies the wireless LAN base station 32 is placed.

Further, the Optional attribute in the Frame Body is extension attribute information, and the Subelement that includes an extension region and includes the Application element is placed in the Optional attribute.

The Application element includes Subelement ID, Length, Application ID, and Event ID, and event information is substantially placed in the Application element.

In the Subelement ID, an ID for identifying the Subelement placed in the Optional attribute is placed, and here, information for specifying the Application element is placed.

In the Length, information of a data length of the Subelement that is the Application element is made possible.

In the Application ID, the ID for identifying an application program to be executed by the wireless LAN terminal 33 is placed.

In the Event ID, the ID for identifying an event that is to occur through execution of an application program that is specified by the Application ID from among application programs that are executed by the wireless LAN terminal 33 is placed.

In the FCS (Frame Check Sequence), an error correction code is placed.

Accordingly, the wireless LAN terminal 33 can recognize a scene in which, for example, an event in a game scenario to be executed by an application program to be executed by the own apparatus occurs, on the basis of the Event ID. The event that is identified by the Event ID may be information that specifies not only a scene in a game scenario but also a character appearing in the scene or a new scene to be developed next to the scene. In other words, information itself specified by the Event ID in an application program specified by this Application ID is event information.

<Connection Switching Process Using Beacon Frame>

In the following, a connection switching process of the wireless LAN base station 32 using the Beacon Frame is described with reference to a flow chart of FIG. 6.

It is to be noted here that the following description is given on the following assumptions. In particular, communication is established between the wireless LAN terminal 33 and the wireless LAN base station 32-1 as depicted in FIG. 1, and the application server 31 transmits application information to the wireless LAN terminal 33 through the wireless LAN base station 32-1 with which communication is established. Further, the wireless LAN terminal 33 is conditioned such that the application unit 76 is executing an application program of a game or the like on the basis of the application information.

In particular, the application information transmission processing unit 43 of the application server 31 controls the communication unit 41 to supply the application information to the wireless LAN base station 32-1 by using the wired network. In the wireless LAN base station 32-1, the control unit 50 controls the wired communication unit 52 to receive the application information and controls the wireless communication unit 51 to supply the application information to the wireless LAN terminal 33. In the wireless LAN terminal 33, the control unit 40 controls the wireless communication unit 71 to receive the application information. Then, the application unit 76 executes the application program on the basis of the received application information.

In step S11, the event information transmission processing unit 42 of the application server 31 controls the communication unit 41 to transmit event information corresponding to an event that is to occur around the wireless LAN base station 32-1 to the wireless LAN base station 32-1.

According to this, the own base station information processing unit 53 of the wireless LAN base station 32-1 controls the wired communication unit 52 in step S31 to acquire the event information transmitted from the application server 31.

In step S12, the event information transmission processing unit 42 of the application server 31 controls the communication unit 41 to transmit event information corresponding to an event that is to occur in the neighborhood of the wireless LAN base station 32-2 to the wireless LAN base station 32-2.

According to this, the own base station information processing unit 53 of the wireless LAN base station 32-2 controls the wired communication unit 52 in step S21 to acquire the event information transmitted from the application server 31.

By the processes so far, event information corresponding to the events that are to occur individually in regions in the neighborhood of the locations at which the wireless LAN base stations 32-1 and 32-2 existing in the same ESS are installed is delivered to the wireless LAN base stations 32-1 and 32-2.

In step S32, the own base station information processing unit 53 of the wireless LAN base station 32-1 controls the wireless communication unit 51 to transmit a Beacon Frame that includes the acquired event information and base station information of the wireless LAN base station 32-1.

Here, in step S41, the base station search processing unit 72 of the wireless LAN terminal 33 controls the wireless communication unit 71 to receive the Beacon Frame from the wireless LAN base station 32-1 and acquire the base station information and the event information included in the Beacon frame from the wireless LAN base station 32-1.

Meanwhile, in step S22, the own base station information processing unit 53 of the wireless LAN base station 32-2 controls the wireless communication unit 51 to send out a Beacon Frame including the acquired event information and the base station information of the wireless LAN base station 32-2.

Here, in step S42, the base station search processing unit 72 of the wireless LAN terminal 33 controls the wireless communication unit 71 to receive the Beacon Frame from the wireless LAN base station 32-2 and acquire the base station information and the event information of the wireless LAN base station 32-2 included in the Beacon frame.

By the processes till now, the wireless LAN terminal 33 receives the Beacon Frames from the wireless LAN base stations 32-1 and 32-2 and acquires the event information and the base station information of them.

In step S43, the base station selection decision processing unit 74 of the wireless LAN terminal 33 executes a base station selection process on the basis of the acquired event information and base station information of the wireless LAN base stations 32-1 and 32-2 and information of the position of the own apparatus measured by the GPS 74. By the base station selection process, the GPS 74 selects with which one of the wireless LAN base stations 32-1 and 32-2 connection is to be established.

<Base Station Selection Process>

Figure 7:
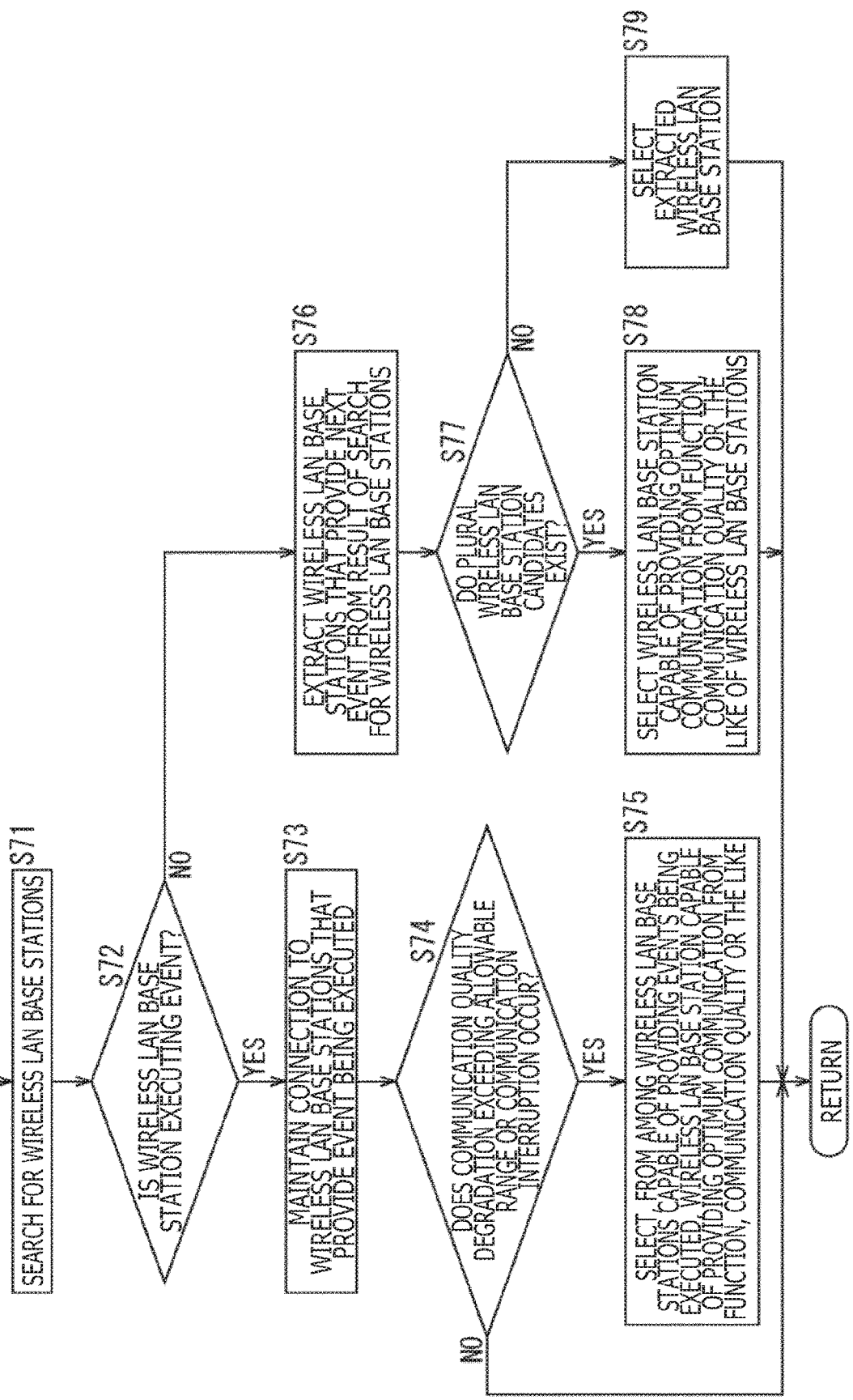
FIG. 7 is a flow chart illustrating a base station selection process.

Here, the base station selection process is described with reference to a flow chart of FIG. 7.

In step S71, the base station selection decision processing unit 74 searches for wireless LAN base stations 32 on the basis of the acquired base station information. In the present case, the wireless LAN base stations 32-1 and 32-2 are searched out.

In step S72, the base station selection decision processing unit 74 decides whether or not any event is being executed by an application program executed by the application unit 76 in the wireless LAN terminal 33 of the own apparatus.

In the case where any event is being executed by an application program executed by the application unit 76 in the wireless LAN terminal 33 of the own apparatus in step S72, the processing advances to step S73.

In step S73, the base station selection decision processing unit 74 causes the state in which connection with the wireless LAN base station 32 with which the base station selection decision processing unit 74 is currently being connected is established to be maintained. In particular, in the present case, since an event is being executed and switching of the wireless LAN base station 32 in the meantime may possibly cause a trouble in the execution of the event, the base station selection decision processing unit 74 controls the base station connection processing unit 73 to maintain the state of connection with the wireless LAN base station 32-1. Accordingly, the wireless communication unit 71 here maintains the state in which communication with the wireless LAN base station 32-1 is established. As a result, the wireless LAN terminal 33 continues the execution of the event without interruption of the communication with the wireless LAN base station 32.

In step S74, the base station selection decision processing unit 74 decides, on the basis of the communication state of the wireless communication unit 71, whether or not degradation of the communication quality exceeding an allowable range or communication interruption occurs.

In the case where it is considered in step S74 on the basis of the communication state of the wireless communication unit 71 that degradation of the communication quality exceeding the allowable range or communication interruption has occurred, the processing advances to step S75.

In step S75, the base station selection decision processing unit 74 selects a wireless LAN base station 32 from among the wireless LAN base stations 32 capable of providing an event being executed, on the basis of the acquired base station information and event information and the information of the position of the own apparatus acquired by the GPS 74. The wireless LAN base station 32 selected here is a wireless LAN base station 32 that can provide communication that is optimum in function and communication quality (a wireless LAN base station 32 of the best communication state capable of providing an event being executed). Thereafter, the processing is ended.

On the other hand, in the case where it is decided in step S74 on the basis of the communication state of the wireless communication unit 71 that none of degradation of the communication quality exceeding the allowable range or communication interruption has occurred, the process in step S75 is skipped.

In the case where no event is being executed by an application program executed by the application unit 76 in the wireless LAN terminal 33 of the own apparatus in step S72, that is, for example, in the case of such a state that an event has ended or in the case where the event has moved to the application event occurring area Z, the processing advances to step S76.

In step S76, the base station selection decision processing unit 74 checks a progress situation of the game executed by the application program being executed by the application unit 76 and the position of the own apparatus acquired by the GPS 74, on the basis of the acquired base station information and event information and the information of the position of the own apparatus acquired by the GPS 74. Then, the base station selection decision processing unit 74 extracts a wireless LAN base station 32 in which a next event is to be executed, as a selection candidate.

In step S77, the base station selection decision processing unit 74 decides whether or not the number of wireless LAN base stations 32 that are extracted and are selection candidates is a plural number.

In the case where the number of wireless LAN base stations 32 that are extracted and are selection candidates is a plural number in step S77, the processing advances to step S78.

In step S78, the base station selection decision processing unit 74 selects, from among the extracted wireless LAN base stations 32 as selection candidates, a wireless LAN base station 32 that can provide communication whose communication quality is optimum (wireless LAN base station 32 of the best communication state), on the basis of the base station information of the wireless LAN base stations 32. Thereafter, the processing is ended.

On the other hand, in step S77, in the case where the number of wireless LAN base stations 32 that are extracted and are selection candidates is not a plural number and a single number, the processing advances to step S79.

In step S79, the base station selection decision processing unit 74 selects the extracted wireless LAN base station 32 that becomes a selection candidate and ends the processing. In particular, in this case, the base station selection decision processing unit 74 instructs the base station connection processing unit 73 to end the state of connection with the wireless LAN base station 32-1 and switch the connection to that with the wireless LAN base station 32-2 extracted as the wireless LAN base station 32 that can provide communication optimum in function and communication quality.

In particular, by the processes described above, in the case where an event is being executed, the connection to the wireless LAN base station 32 with which connection is currently being established is continued unless the communication state suffers from deterioration beyond an allowable range or from communication interruption. On the other hand, in the case where an event is not being executed, the progress situation of a game is checked, and a wireless LAN base station 32 by which a next event is to be executed is extracted. Then, in the case where a plurality of wireless LAN base stations 32 is selected, a wireless LAN base station 32 that is optimum in function and communication quality is selected on the basis of acquired base station information and event information and information of the position of the own apparatus acquired by the GPS 74.

As a result, in a state in which an event is being executed, the function and the communication quality have priority and the wireless LAN base station 32 is not switched, and therefore, interruption of processing for execution of an event caused by switching of the wireless LAN base station 32 can be suppressed. Further, when an event is not being executed, a wireless LAN base station 32 that is optimum in function and communication quality is selected in preparation for a next event, and therefore, when the next event is executed, a good communication state can be assured.

Figure 6:
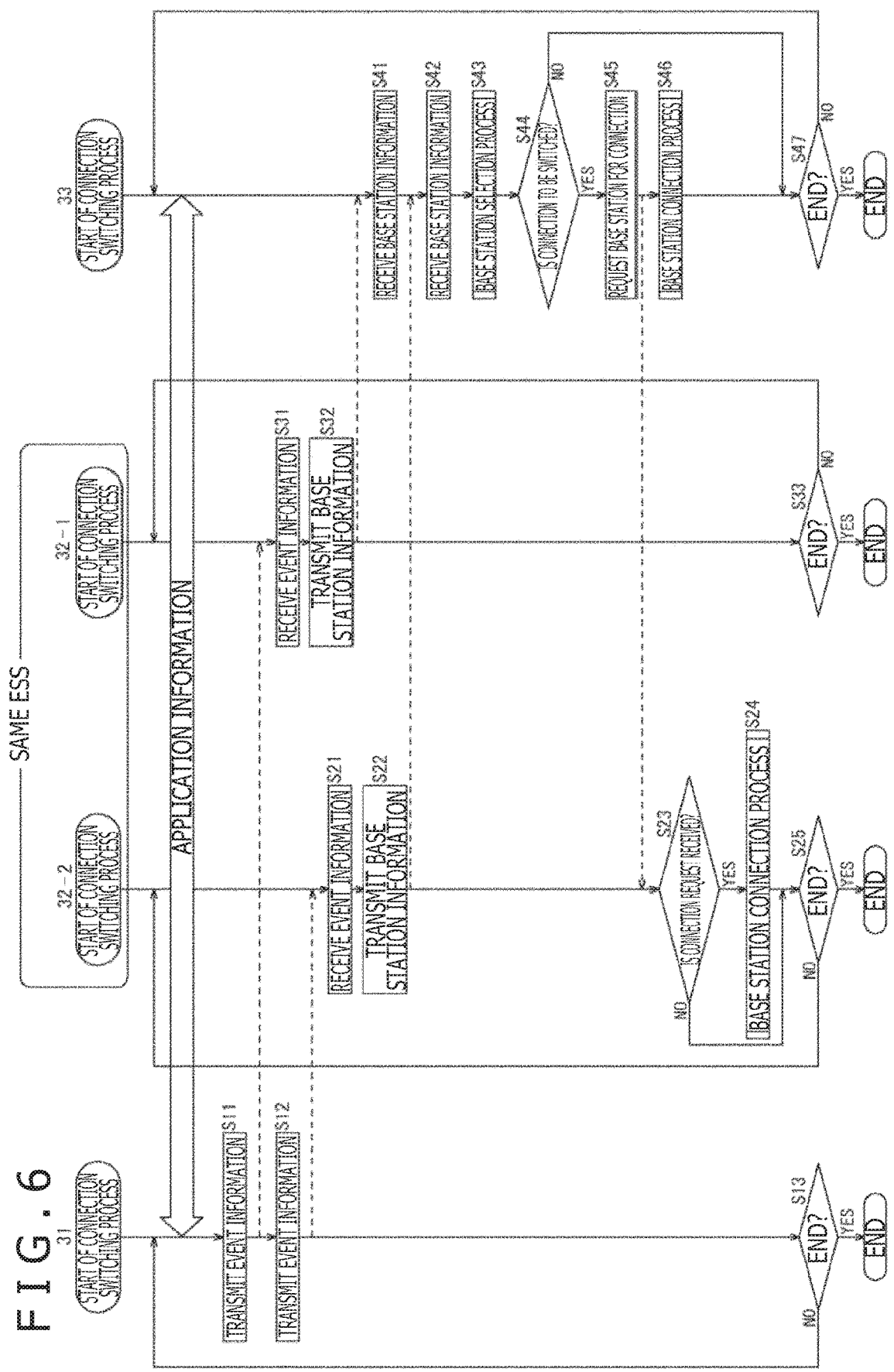
FIG. 6 is a flow chart illustrating a connection switching process using the Beacon Frame.

Here, the description is given referring back to the flow chart of FIG. 6.

In step S44, the base station connection processing unit 73 decides whether or not an instruction to switch the wireless LAN base station 32 is received.

In the case where an instruction to switch the wireless LAN base station 32 is received in step S44, that is, in the case where an instruction is given to switch the wireless LAN base station 32 by the base station selection process, the processing advances to step S45.

In step S45, the base station connection processing unit 73 controls the wireless communication unit 71 to end the current connection with the wireless LAN base station 32 and requests the newly selected wireless LAN base station 32 for connection. In particular, in the present case, the base station connection processing unit 73 controls the wireless communication unit 71 to end the current connection to the wireless LAN base station 32-1 and request the newly selected wireless LAN base station 32-2 for connection.

On the other hand, in step S23, the own base station information processing unit 53 of the wireless LAN base station 32-2 controls the wireless communication unit 51 to decide whether or not a connection request is received from the wireless LAN terminal 33.

In the case where a connection request is received in step S23, for example, by the process in step S45, the processing advances to step S24.

In step S24, the own base station information processing unit 53 of the wireless LAN base station 32-2 controls the wireless communication unit 51 to execute a base station connection process, for example, by 4-Way Handshake to establish a communication state according to the connection request from the wireless LAN terminal 33.

Simultaneously, in step S46, the base station connection processing unit 73 of the wireless LAN terminal 33 controls the wireless communication unit 71 to establish communication with the wireless LAN base station 32-2.

On the other hand, in the case where an instruction to switch the wireless LAN base station 32 is not received in step S44, that is, in the case where the connection to the wireless LAN base station 32-1 is to be maintained by the base station selection process, the processes in steps S45 and S46 are skipped.

According to this, in the case where a connection request is not received in step S23, the process in step S24 is skipped.

Furthermore, it is decided, in each of the steps S13, S25, S33, and S47, whether or not an instruction to end the processing is received. In the case where an instruction to end the processing is not received, the processing returns to step S11, S21, S31, or S41 and the individually succeeding processes are repeated.

In other words, the processes described above are repeated at predetermined intervals of time at which a Beacon Frame is transmitted.

Then, in the case where an instruction to end the processing is received in any of steps S13, S25, S33, and S47, the processing is ended.

By the processes described above, in addition to a general switching process between the wireless LAN terminal 33 and the wireless LAN base station 32 on the basis of a general communication state using base station information using a Beacon Frame, use of event information makes it possible to implement selection of a wireless LAN base station 32 on the basis of whether or not an event is being executed or of information of a next event.

As a result, unless there is a problem in the communication state, switching between a wireless LAN terminal 33 and a wireless LAN base station 32 is suppressed from being performed during execution of an event. Therefore, such a situation that communication is interrupted until a communication state is established again is eliminated, and it becomes possible to implement execution of an event by an application program without interruption.

Further, in the case where the communication state becomes worse during execution of an event so that it becomes necessary to switch the wireless LAN base station 32, the connection to the wireless LAN base station 32 to which communication is established is cut first, and then connection to a wireless LAN base station 32 that is best in communication state is established. Therefore, the period of time in which communication is interrupted and which becomes an overhead during execution of an event can be minimized.

Furthermore, in the case where an event is not being executed, the wireless LAN base station 32 is switched taking a next event into consideration. Therefore, the next event by the wireless LAN terminal 33 can be implemented in a good communication state.

2. Second Embodiment

<Connection Switching Between Wireless LAN Base Station and Wireless LAN Terminal Using Probe Response Frame>

Although the foregoing description is directed to connection switching between a wireless LAN base station 32 and a wireless LAN terminal 33 using the Beacon Frame, the Probe Response Frame may be used in place of the Beacon Frame.

The Probe Response Frame is a Frame by Active Scan prescribed by the IEEE 802.11 specification. Although the Beacon Frame by Passive Scan is transmitted (delivered) from a wireless LAN base station 32 to neighboring wireless LAN terminals 33 at predetermined intervals of time, the Probe Response Frame is a Frame transmitted in response to a Probe Request that is a base station information request when the Probe Request is transmitted from a wireless LAN terminal 33 around the wireless LAN base station 32 to the wireless LAN base station 32.

It is to be noted that the configuration of the Probe Response Frame is the same as the configuration of the Beacon Frame, and therefore, description of the same is omitted.

In particular, in the case where the Probe Response Frame is used, when the Probe Request that is a base station information request from a wireless LAN terminal 33 is transmitted, the own base station information processing unit 53 transmits a Probe Response Frame including base station information and event information to the wireless LAN terminal 33.

<Connection Process Using Probe Response Frame>

In the following, a connection switching process using the Probe Response Frame is described with reference to a flow chart of FIG. 8.

It is to be noted that processes in steps S111 to S113, S121, S124 to S126, S131, S134, and S145 to S149 are similar to the processes in steps S11 to S13, S21, S23 to S25, S31, S33, and S43 to S47 in FIG. 6, and therefore, description of them is omitted.

In particular, by the processes in steps S111, S112, S121, and S131, event information corresponding to events individually occurring in neighboring regions in which the wireless LAN base stations 32-1 and 32-2 existing in the same ESS are installed is delivered to the wireless LAN base stations 32-1 and 32-2.

In step S141, the base station search processing unit 72 of the wireless LAN terminal 33 controls the wireless communication unit 71 to transmit a Probe Request including a base station information request to the wireless LAN base station 32-1.

According to this, in step S132, the own base station information processing unit 53 of the wireless LAN base station 32-1 controls the wireless communication unit 51 to receive the Probe Request transmitted thereto and including the base station information request.

Meanwhile, in step S142, the base station search processing unit 72 of the wireless LAN terminal 33 controls the wireless communication unit 71 to transmit a Probe Request including a base station information request to the wireless LAN base station 32-2.

According to this, in step S122, the own base station information processing unit 53 of the wireless LAN base station 32-2 controls the wireless communication unit 51 to receive the Probe Request transmitted thereto and including the base station information request.

By the processes till now, each of the wireless LAN base stations 32-1 and 32-2 receives the Probe Request including the base station information request.

Then, in step S133, the own base station information processing unit 53 of the wireless LAN base station 32-1 controls the wireless communication unit 51 to send out a Probe Response Frame including the acquired event information and base station information of the wireless LAN base station 32-1.

Here, in step S143, the base station search processing unit 72 of the wireless LAN terminal 33 controls the wireless communication unit 71 to receive the Probe Response Frame from the wireless LAN base station 32-1 and acquire the base station information and the event information included in the Probe Response Frame of the wireless LAN base station 32-1.

On the other hand, in step S123, the own base station information processing unit 53 of the wireless LAN base station 32-2 controls the wireless communication unit 51 to send out a Probe Response Frame including the acquired event information and base station information of the wireless LAN base station 32-2.

Here, in step S144, the base station search processing unit 72 of the wireless LAN terminal 33 controls the wireless communication unit 71 to receive the Probe Response Frame from the wireless LAN base station 32-2 and acquire the base station information and the event information of the wireless LAN base station 32-2 included in the Probe Response Frame.

By the processes described above, the wireless LAN terminal 33 receives the Probe Response Frames of the wireless LAN base stations 32-1 and 32-2 to acquire the event information and the base station information of them. Thus, in the process in step S145, the wireless LAN terminal 33 can execute a base station selection process on the basis of the position information of the own apparatus in addition to the acquired event information and base station information and can thereby select a wireless LAN base station 32 with which connection should be established.

As a result, since switching between the wireless LAN terminal 33 and the wireless LAN base station 32 is not performed any more during execution of an event unless there is a problem in the communication state, such a situation that communication is interrupted until a communication state is established again is eliminated. Consequently, it is possible to smoothly implement execution of an event.

Further, in the case where the communication state becomes worse during execution of an event so that it becomes necessary to switch the wireless LAN base station 32, the connection to the wireless LAN base station 32 to which communication is established is cut first, and then connection to a wireless LAN base station 32 that is best in communication state is established. Therefore, the period of time in which communication is interrupted and which becomes an overhead during execution of an event can be minimized.

Furthermore, in the case where an event is not being executed, the wireless LAN base station 32 is switched taking a next event into consideration. Therefore, the next event by the wireless LAN terminal 33 can be implemented in a good communication state.

It is to be noted that the Probe Request described above is transmitted from the wireless LAN terminal 33 in the case where there is no transmission of the Beacon Frame that is to be transmitted at predetermined intervals of time from the wireless LAN base station 32. Accordingly, as long as a Beacon Frame is received from the wireless LAN base station 32 at predetermined intervals of time by the wireless LAN terminal 33, the wireless LAN terminal 33 acquires base station information and event information from the Beacon Frame. Then, when the wireless LAN terminal 33 is placed into a state in which it cannot receive the Beacon Frame at the predetermined intervals of time, base station information and event information can be acquired from the Probe Response Frame that is transmitted from the wireless LAN base station 32, according to the Probe Request transmitted from the wireless LAN terminal 33.

In other words, by using both the Beacon Frame and the Probe Response Frame such that event information and base station information are substantially included in both of them, event information and base station information are supplied in high frequency to the wireless LAN terminal 33. Consequently, switching for connection with an optimum wireless LAN base station 32 can be implemented. Naturally, event information and base station information may be included in only one of the Beacon Frame and the Probe Response Frame.

3. Third Embodiment

<Connection Switching Between Wireless LAN Base Station and Wireless LAN Terminal Using Neighbor Report Response Frame>

The foregoing description is directed to processes of setting an Application element in an extension region of the Beacon Frame or the Probe Response Frame and transmitting event information together with base station information such that the wireless LAN terminal 33 selects a wireless LAN base station 32 with which connection should be established and switches the connection.

Accordingly, if the Application element indicative of event information can be transmitted from the wireless LAN base station 32 to the wireless LAN terminal 33 in addition to base station information of wireless LAN base stations 32 with which connection can be established, then it can be transmitted by another method.

For example, event information may be transmitted together with base station information by using the Beacon Frame or the Probe Response Frame with the Application element set to the subelement in the Neighbor Report element prescribed by the IEEE 802.11 specification.

Figure 9:
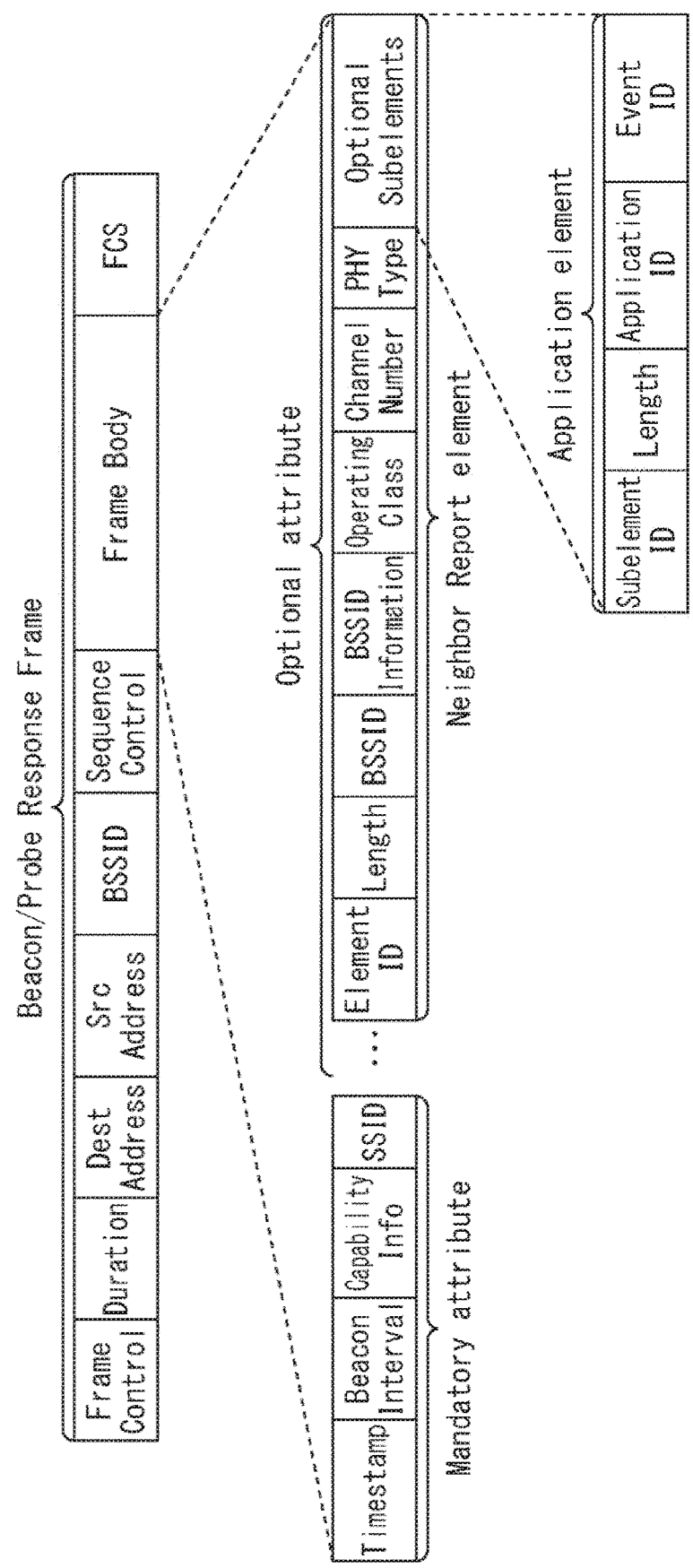
FIG. 9 is a view illustrating an example of a configuration of a Neighbor Report element.

The Neighbor Report element includes base station information collected from and set for each of neighboring wireless LAN base stations 32 connected by a wired network including the own apparatus according to the Neighbor Request from the wireless LAN terminal 33. The Neighbor Report element is placed in the Optional Attribute in the Frame Body of the Beacon Frame or the Probe Response Frame as depicted in FIG. 9. It is to be noted that, though not depicted, in the case where a plurality of wireless LAN base stations 32 exists in the neighborhood of the wireless LAN terminal 33, a plurality of Neighbor Report elements of the neighboring wireless LAN base stations 32 including the own apparatus is included in the Optional Attribute.

More particularly, the Neighbor Report element includes Element ID, Length, BSSID, BSSID Information, Operating Class, Channel Number, PHY Type, and Optional Subelements and is configured such that the Application element is set in the Optional Subelements.

In the Element ID, the ID for identifying the Element is placed, and here, an ID indicative of the Neighbor Report element is placed.

In the Length, information of the data length of this Element is placed.

In the SSID, the ID for identifying a neighboring wireless LAN base station 32 is placed.

In the BSSID Information, capability information of a neighboring wireless LAN base station 32 is placed, and base station information is included in part of the capability information. In particular, the base station information includes communication quality of a wireless LAN base station (RSSI, SNR, AP load information, and throughput information of a backhaul network) and information relating to wireless functions of the wireless LAN base station (wireless LAN base station identifier, corresponding wireless band (2.4 GHz, 5 GHz, 60 GHz or the like), operation channels in wireless bands, and supported wireless LAN security functions (encryption and authentication algorithms)) described hereinabove.

In the Operating Class, information indicative of a communication channel set of a neighboring wireless LAN base station 32 is placed.

In the Channel Number, information of a channel number used for communication by the neighboring wireless LAN base station 32 is placed.

In the PHY Type, information indicative of a type (model) in the physical layer of the neighboring wireless LAN base station 32 is placed.

The Optional Subelement is an extension region of the Neighbor Report element, and here, the Application element is placed.

<Example of Configuration of Wireless LAN Base Station where Neighbor Report Element is Used>

Now, an example of a configuration of the wireless LAN base station 32 in the case where the Neighbor Report element is used is described with reference to FIG. 10. It is to be noted that, in the wireless LAN base station 32 of FIG. 10, components having the same functions as those of the wireless LAN base station 32 of FIG. 3 are denoted by the same reference signs and description of them is omitted.

Figure 3:
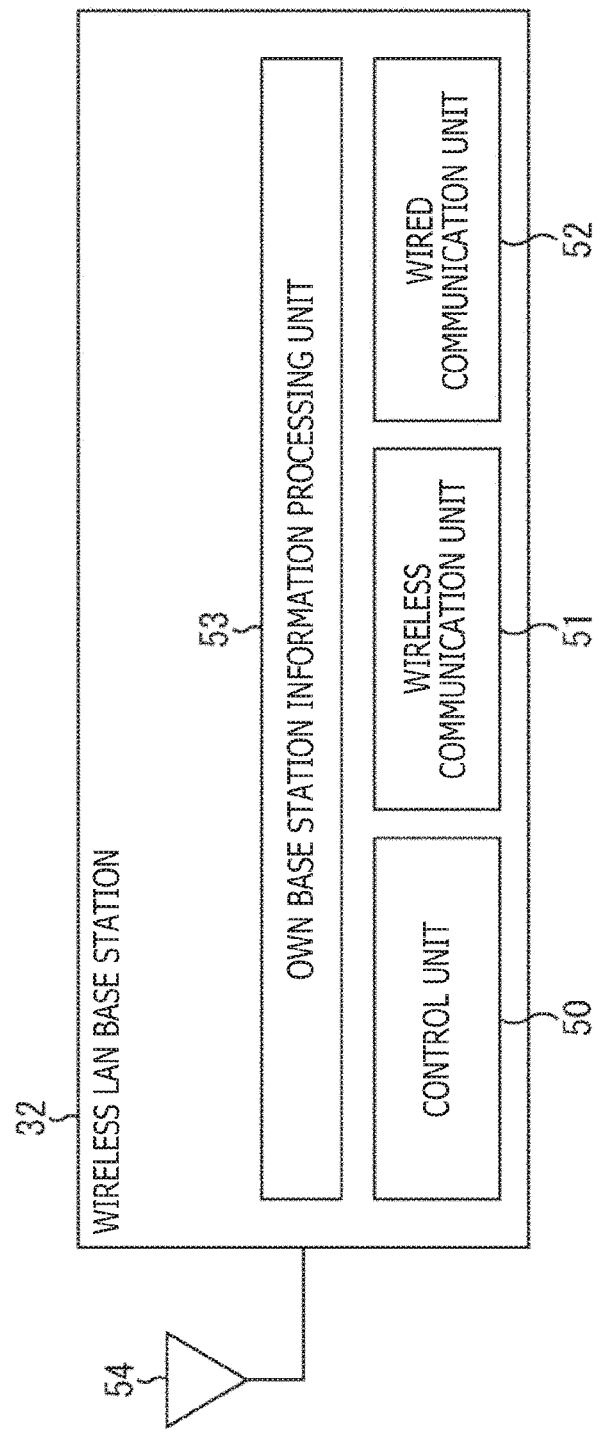
FIG. 3 is a view illustrating an example of a configuration of first and second embodiments of a wireless LAN base station of the communication system of FIG. 1.
Figure 10:
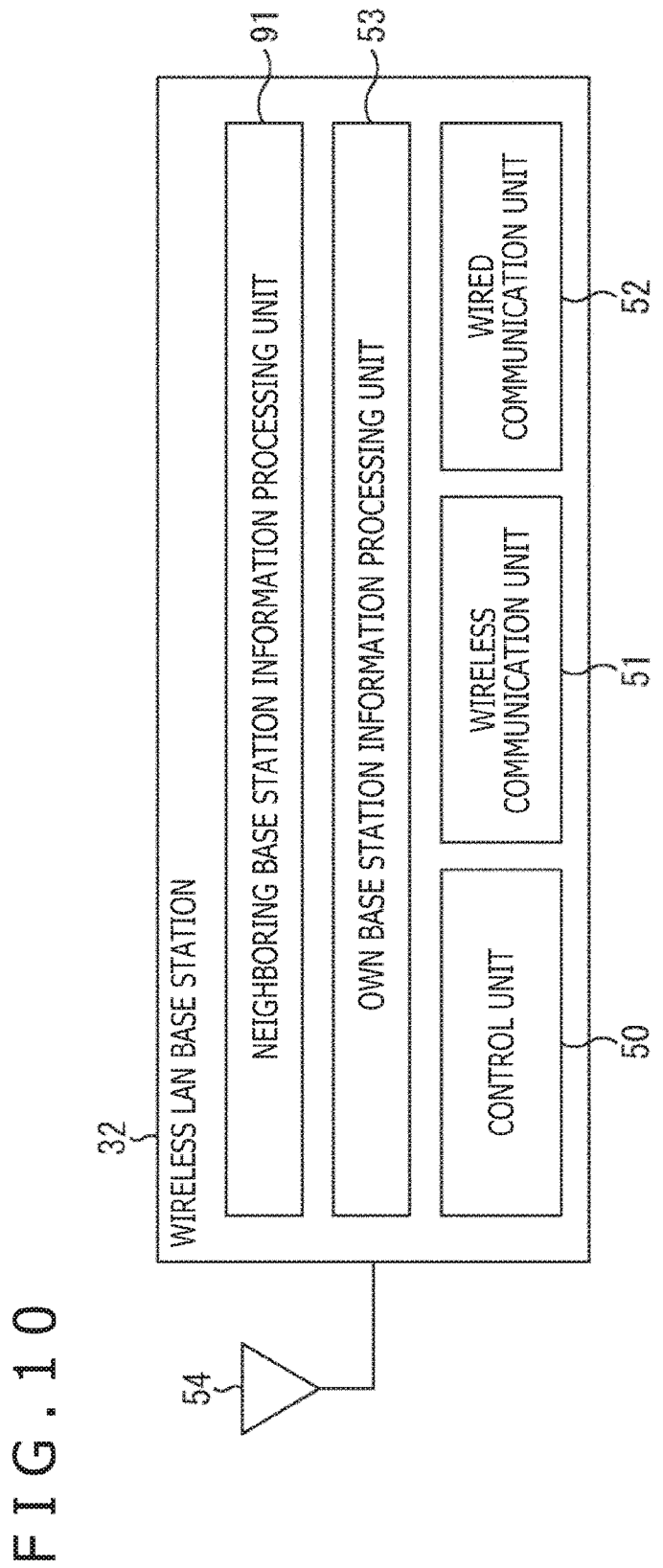
FIG. 10 is a view illustrating an example of a configuration of a third embodiment of the wireless LAN base station of the communication system of FIG. 1.

In particular, the wireless LAN base station 32 of FIG. 10 is different from the wireless LAN base station 32 of FIG. 3 in that it includes a neighboring base station information processing unit 91.

The neighboring base station information processing unit 91 controls, when the Neighbor Request is to be transmitted as a neighboring base station information request from the wireless LAN terminal 33, the wired communication unit 52 to collect base station information and event information provided by other wireless LAN base stations 32 existing in the same ESS (Extended Service Set), through a wired network. Then, the neighboring base station information processing unit 91 generates neighboring base station information on the basis of the collected base station information and event information of the wireless LAN base stations 32 existing in the neighborhood of the own apparatus and the base station information and the event information of the own apparatus. The neighboring base station information processing unit 91 places the neighboring base station information into the Neighbor Report element for each of the wireless LAN base stations 32 including the own apparatus. In particular, the neighboring base station information includes the base station information and the event information of the wireless LAN base stations 32 existing in the neighborhood.

The own base station information processing unit 53 places, when a Beacon Frame or a Probe Response Frame is to be generated according to a Neighbor Request from the wireless LAN terminal 33, the Neighbor Report element including neighboring base station information generated by the neighboring base station information processing unit 91 into the Optional Attribute.

By such a configuration as described, the wireless LAN terminal 33 acquires the Probe Response Frame including the Neighbor Report element after it transmits the Neighbor Request that is a request for neighboring base station information. Therefore, only by receiving neighboring base station information once, the wireless LAN terminal 33 can acquire neighboring base station information and event information of each of wireless LAN base stations 32 existing in the neighborhood, and therefore, congestion of communication can be moderated.

Further, the Neighbor Report element may be placed otherwise into the Optional Attribute of the Beacon Frame. In this case, it is only necessary for the wireless LAN base station 32 to transmit a Beacon Frame including the Neighbor Report element from the wireless LAN terminal 33 at predetermined intervals of time.

<Connection Switching Process Using Neighbor Report Element>

In the following, a connection switching process using the Neighbor Report element is described with reference to a flow chart of FIG. 11.

It is to be noted that processes in steps S211 to S213, S221, S223 to S225, S231, S234, and S243 to S247 are similar to the processes in steps S11 to S13, S21, S23 to S25, S31, S33, and S43 to S47 of FIG. 6, and therefore, description of them is omitted.

In particular, by the processes in steps S211, S212, S221, and S231, event information corresponding to events occurring individually in neighboring regions set for the wireless LAN base stations 32-1 and 32-2 existing in the same ESS is delivered to the wireless LAN base stations 32-1 and 32-2.

In step S241, the base station search processing unit 72 of the wireless LAN terminal 33 controls the wireless communication unit 71 to transmit a Neighbor Request that is a neighboring base station information request to the wireless LAN base station 32-1.

According to this, in step S232, if a Neighbor Request that is a neighboring base station information request is received, then the neighboring base station information processing unit 91 of the wireless LAN base station 32-1 controls the wired communication unit 52 to collect base station information and event information of the neighboring wireless LAN base station 32-2 through a wired network.

At this time, the own base station information processing unit 53 of the wireless LAN base station 32-2 that is a neighboring wireless LAN base station 32 controls the wired communication unit 52 in step S222 to transmit base station information and event information to the wireless LAN base station 32-1 from which the request for base station information is received. By the series of processes described above, the neighboring base station information processing unit 91 of the wireless LAN base station 32-1 collects base station information and event inform from neighboring wireless LAN base stations 32 to generate neighboring base station information.

In step S233, the own base station information processing unit 53 generates a Neighbor Report element by using the neighboring base station information. Then, the own base station information processing unit 53 generates a Probe Response Frame including the Neighbor Report element and controls the wireless communication unit 51 to transmit the Probe Response Frame to the wireless LAN terminal 33.

In step S242, the base station search processing unit 72 of the wireless LAN terminal 33 controls the wireless communication unit 71 to receive the Probe Response Frame of the wireless LAN base station 32-1 and acquires base station information and event information of the neighboring wireless LAN base station 32-2 on the basis of the neighboring base station information included in the Neighbor Report element in the Probe Response Frame.

By the processes described above, the wireless LAN terminal 33 receives Probe Response Frames including Neighbor Report elements of the wireless LAN base stations 32-1 and 32-2 and including neighboring base station information by a single time of communication and acquires the event information and the base station information of them. Then, the wireless LAN terminal 33 can execute, in the process in step S243, a base station selection process on the basis of the information of the position of the own apparatus in addition to the acquired event information and base station information to select a wireless LAN base station 32 with which connection should be established.

As a result, unless there is a problem in the communication state, switching between a wireless LAN terminal 33 and a wireless LAN base station 32 is suppressed from being performed during execution of an event. Therefore, such a situation that communication is interrupted until a communication state is established again is eliminated, and it becomes possible to implement execution of an event smoothly.

Further, in the case where the communication state becomes worse during execution of an event until it becomes necessary to switch the wireless LAN base station 32, the connection to the wireless LAN base station 32 to which communication is established is cut first, and then connection to a wireless LAN base station 32 that is best in communication state is established. Therefore, the period of time in which communication is interrupted and which becomes an overhead during execution of an event can be minimized.

Furthermore, since base station information and event information of a neighboring wireless LAN base station 32 can be acquired by a single time of communication, it is possible to promptly implement a base station selection process and moderate congestion in communication.

It is to be noted that the foregoing description is directed to an example of a case in which the wireless LAN terminal 33 receives a Neighbor Report element after it transmits a Neighbor Request and thus uses what is generally called a Probe Response Frame. However, when the wireless LAN base station 32 transmits a Beacon Frame at predetermined intervals of time, it may transmit the Beacon Frame in a state in which a Neighbor Report element is included in the Beacon Frame. In this case, the process of the wireless LAN terminal 33 for transmitting a Neighbor Request becomes unnecessary.

4. Fourth Embodiment

<Connection Switching Between Wireless LAN Base Station and Wireless LAN Terminal Using BSS Transition Management Request Frame>

The foregoing description is directed to a process of setting an Application element in the Optical Subelement of the Neighbor Report element and generating and transmitting neighboring base station information including base station information and event information of neighboring wireless LAN base stations 32 such that a wireless LAN terminal 33 selects a wireless LAN base station 32 with which connection should be established and switches the connection.

As described above, another method may be applied if an Application element indicative of event information can be transmitted from the wireless LAN base stations 32 to a wireless LAN terminal 33 in addition to base station information of wireless LAN base stations 32 to which connection can be established.

Thus, for example, a Neighbor Report element may be set to the BSS Transition Candidate List Entries of the BSS Transition Management Request Frame prescribed in the IEEE 802.11 specification such that event information is included in and transmitted together with neighboring base station proposal information in the form of a list that proposes wireless LAN base stations 32 with which connection should be established from among neighboring wireless LAN base stations 32.

The BSS Transition Management Request Frame is a Frame that proposes a wireless LAN base station 32 that is optimum (is best in communication state) for the connection by a wireless LAN terminal 33 from which a request for neighboring base station proposal information is issued, on the basis of the neighboring base station information of neighboring wireless LAN base stations 32 according to a request for neighboring base station proposal information from the wireless LAN terminal 33.

The BSS Transition Management Request Frame is configured, for example, in such a manner as depicted in the upper stage of FIG. 12.

In particular, the BSS Transition Management Request Frame includes Category, WNM Action, Dialog token, Request Mode, Disassociation Timer, Validity Interval, BSS Transition Duration, Session Information URL, and BSS Transition Candidate List Entries.

In the Category, information indicating that the category is the WNM Frame is placed.

In the WNM (Wireless Network Management) Action, information indicative of the type of the WNM Frame is placed.

In the Dialog Token, a unique identifier for frame exchange is placed.

In the Request Mode, information indicative of whether the wireless LAN base stations 32 included in a list for proposal of connection are candidates for implementation of an ideal communication state or mere candidates for re-connection regardless of the communication state and information that suggests a connection method to a proposed wireless LAN base station 32 are placed.

In the Disassociation Timer, information of a period of time required until connection to a wireless LAN base station 32 that is connected in a state in which communication is established currently is to be cut is placed.

In the Validity Interval, information of a period of time effective as the Beacon Interval for effectively using the list for proposal of connection is placed.

In the BSS Transition Duration, information indicative of a reservation time period until transmission of the BSS Transition Management Request Frame is completed is placed.

In the Session Information URL, information of a URL for disclosing information regarding a session relating to the BSS Transition Management Request Frame is placed.

In the BSS Transmission Candidate List Entries, information of the Neighbor Report elements of the wireless LAN base stations 32 to which connection is proposed is placed as a list as depicted in the middle stage of FIG. 12. In particular, in the case where connection to a plurality of wireless LAN base station 32 is proposed, the Neighbor Report elements of them are placed in the form of a list.

As indicated in the lower stage of FIG. 12, in the Neighbor Report element, the Application element is placed in the Optional Subelement.

In particular, since the Application elements are supplied from the wireless LAN base stations 32 to the wireless LAN terminal 33 by the BSS Transition Management Request Frame having such a configuration as depicted in FIG. 12, the wireless LAN terminal 33 can select a wireless LAN base station 32 with which connection should be established.

The BSS Transition Management Request Frame includes information that basically proposes an optimum (best in communication state) wireless LAN base station 32 according to a communication state. Thus, when the wireless LAN terminal 33 selects a wireless LAN base station 32 with which connection should be established, it uses the BSS Transition Management Request Frame for its reference to the last and selects by itself a wireless LAN base station 32 with which connection should be established, taking event information into account.

It is to be noted that, in such a case that the number of wireless LAN terminals 33 connected to a specific wireless LAN base station 32 is so great that the wireless LAN terminal 33 takes into consideration distribution of communication according to a congestion situation of communication, a wireless LAN base station 32 proposed by the BSS Transition Management Request Frame may be connected preferentially.

<Example of Configuration of Wireless LAN Base Station where BSS Transition Management Request Frame is Used>

Now, an example of a configuration of the wireless LAN base station 32 in the case where the BSS Transition Management Request Frame is used is described with reference to FIG. 13. It is to be noted that components of the wireless LAN base station 32 of FIG. 13 having the same functions as those of the wireless LAN base station 32 of FIG. 3 are denoted by the same reference signs and description of them is omitted.

Figure 13:
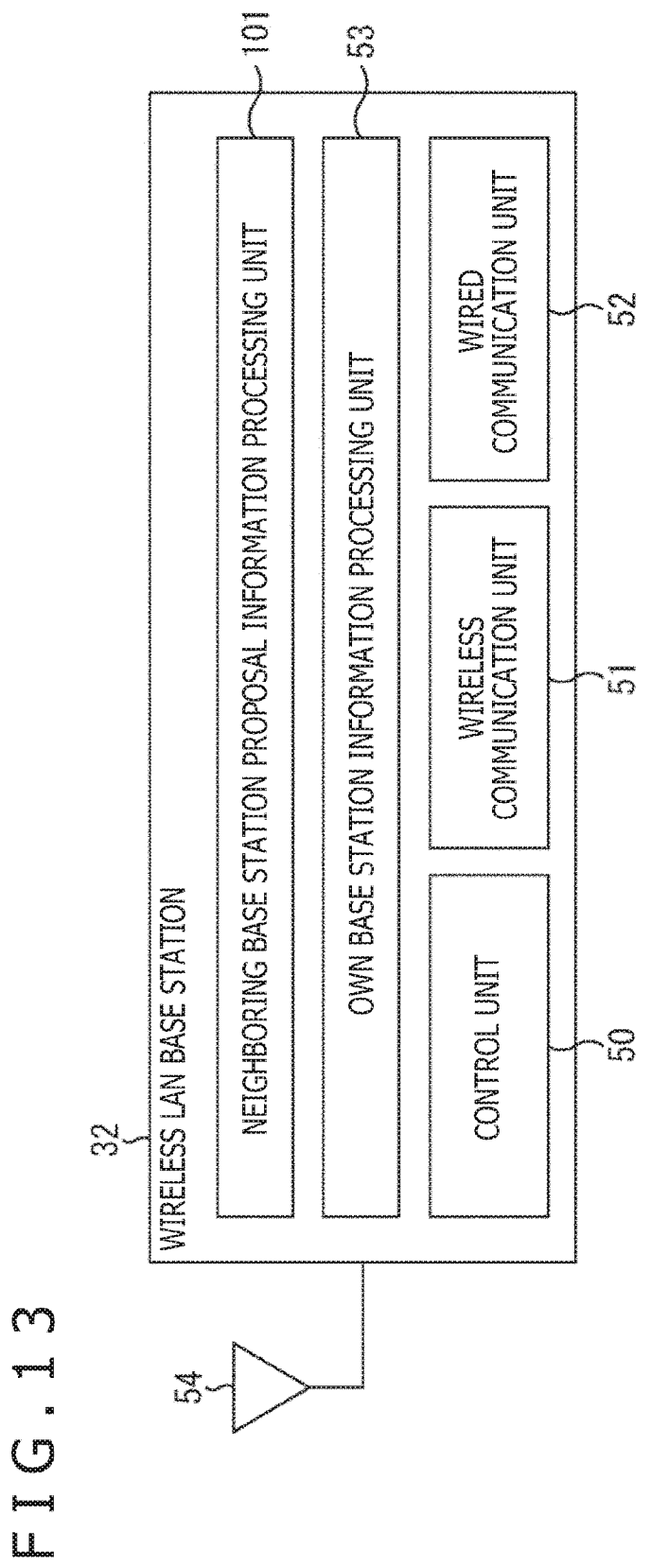
FIG. 13 is a view illustrating an example of a configuration of a fourth embodiment of the wireless LAN base station of the communication system of FIG. 1.

In particular, the wireless LAN base station 32 of FIG. 13 is different from the wireless LAN base station 32 of FIG. 3 in that it includes a neighboring base station proposal information processing unit 101.

The neighboring base station proposal information processing unit 101 controls, when a request for neighboring base station proposal information is received from a wireless LAN terminal 33, the wired communication unit 52 to collect base station information and event information provided by other wireless LAN base stations 32 existing in the same ESS (Extended Service Set), through a wired network.

Then, the neighboring base station proposal information processing unit 101 generates a Neighbor Report element as neighboring base station information on the basis of the collected base station information of the wireless LAN base stations 32 existing in the neighborhood. In particular, the neighboring base station information includes base station information and event information of wireless LAN base stations 32 existing in the neighborhood.

Further, the neighboring base station proposal information processing unit 101 uses the neighboring base station information to search for a wireless LAN base station 32 that either is best in communication state after communication is established by a wireless LAN terminal 33 from which a request for neighboring base station proposal information is issued or has a communication state better than a predetermined condition.

Then, the neighboring base station proposal information processing unit 101 lists Neighbor Report elements of wireless LAN base stations 32 including neighboring base station information of wireless LAN base stations 32 of a result of search to generate the BSS Transition Candidate List Entries that are neighboring base station proposal information. Here, when the Neighbor Report elements that are neighboring base station information of the wireless LAN base stations 32 of the result of the search are listed, the Neighbor Report elements of the wireless LAN base stations 32 may be listed such that a wireless LAN base station 32 that is better in condition comes to a higher order rank to generate the BSS Transition Candidate List Entries that are neighboring base station proposal information.

The own base station information processing unit 53 generates a BSS Transition Management Request Frame using the BSS Transition Candidate List Entries including neighboring base station proposal information generated by the neighboring base station proposal information processing unit 101 according to a request for neighboring base station proposal information from the wireless LAN terminal 33.

By such a configuration as described above, if the wireless LAN terminal 33 receives neighboring base station proposal information included in the BSS Transition Management Request Frame only once after it issues a request for neighboring base station proposal information, then the wireless LAN terminal 33 can acquire base station information and event information of the wireless LAN base stations 32 individually existing in the neighborhood. Therefore, congestion of communication can be moderated.

<Connection Switching Process Using BSS Transition Management Request Frame>

Figure 14:
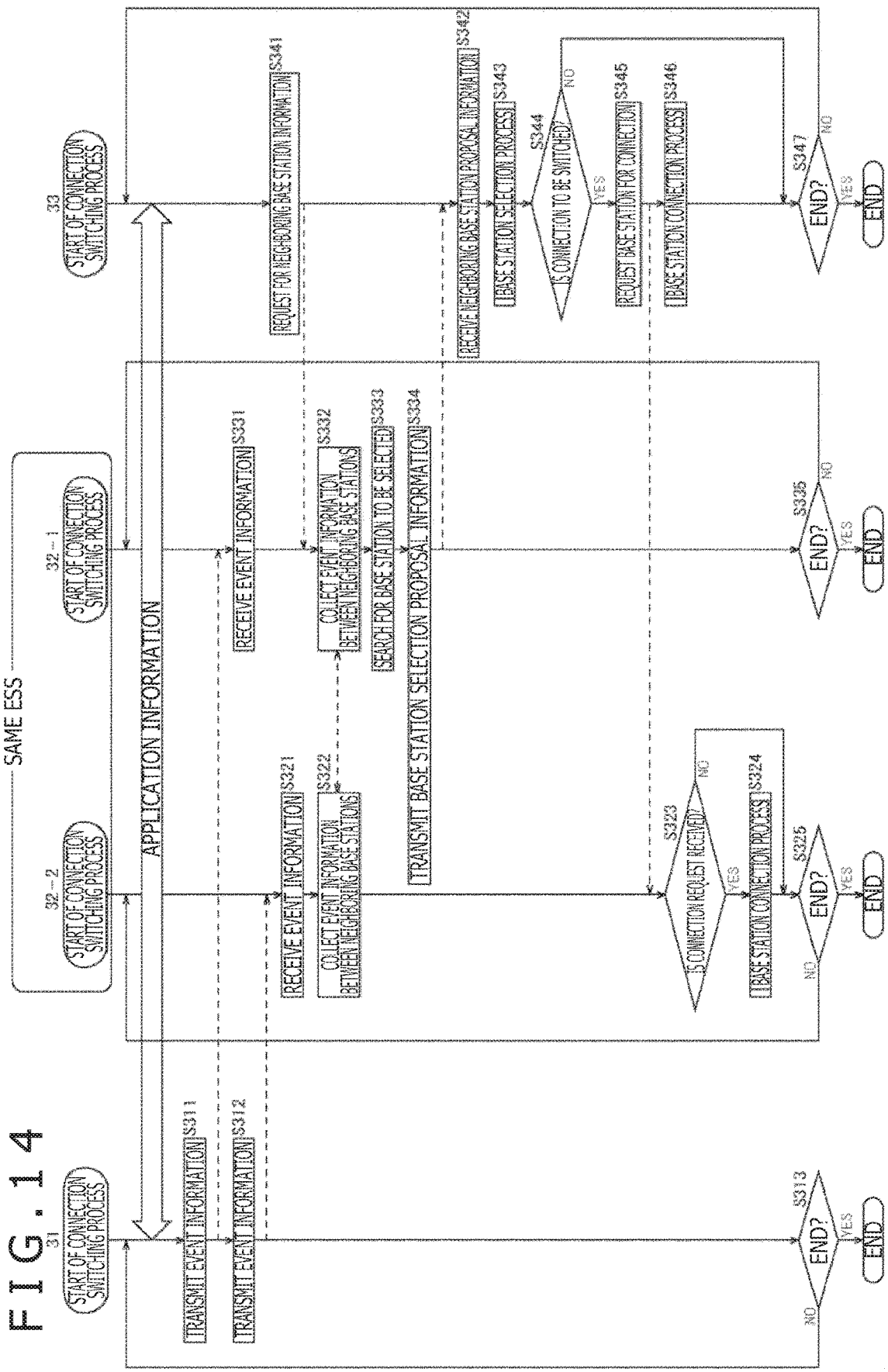
FIG. 14 is a flow chart illustrating a connection switching process using the BSS Transition Management Request Frame.

Now, a connection switching process using the BSS Transition Management Request Frame is described with reference to a flow chart of FIG. 14.

It is to be noted that the processes in steps S311 to S313, S321, S323 to S325, S331, S335, and S343 to S347 are similar to the processes in steps S11 to S13, S21, S23 to S25, S31, S33, and S43 to S47 of FIG. 6, and therefore, description of them is omitted.

In particular, by the processes in steps S311, S312, S321, and S331, event information corresponding to events occurring individually in neighboring regions in which the wireless LAN base stations 32-1 and 32-2 existing in the same ESS are installed is delivered to the wireless LAN base stations 32-1 and 32-2.

In step S341, the base station search processing unit 72 of the wireless LAN terminal 33 controls the wireless communication unit 71 to transmit information for requesting the wireless LAN base station 32-1 for neighboring base station proposal information.

According to this, in step S332, the neighboring base station proposal information processing unit 101 of the wireless LAN base station 32-1 controls the wired communication unit 52 to collect base station information and event information of the neighboring wireless LAN base station 32-2 through a wired network and generate neighboring base station information.

At this time, the own base station information processing unit 53 of the wireless LAN base station 32-2 that is a neighboring wireless LAN base station 32 controls, in step S322, the wired communication unit 52 to transmit base station information and event information to the wireless LAN base station 32-1 from which the request for base station information is received. By the series of processes described, the neighboring base station information processing unit 91 of the wireless LAN base station 32-1 collects base station information and event information from the neighboring wireless LAN base stations 32 and generates neighboring base station information.

In step S333, the neighboring base station proposal information processing unit 101 uses the neighboring base station information to search for a wireless LAN base station 32 that either is best in communication state after communication is established by a wireless LAN terminal 33 from which a request for neighboring base station proposal information is issued or has a communication state better than a predetermined condition. Then, the neighboring base station proposal information processing unit 101 lists the Neighbor Report elements that are neighboring base station information of the wireless LAN base stations 32 of a result of the search to generate BSS Transition Candidate List Entries that are neighboring base station proposal information.

In step S334, the own base station information processing unit 53 generates a BSS Transition Management Request Frame including the BSS transition Candidate List Entries as neighboring base station proposal information. Then, the own base station information processing unit 53 controls the wireless communication unit 51 to transmit the generated BSS Transition Management Request Frame including the BSS Transition Candidate List Entries as neighboring base station proposal information.

In step S342, the base station search processing unit 72 of the wireless LAN terminal 33 controls the wireless communication unit 71 to receive the BSS Transition Management Request Frame of the wireless LAN base station 32-1 and acquires the base station information and the event information of the neighboring wireless LAN base station 32-2 on the basis of the neighboring base station information included in the Neighbor Report element in the BSS Transition Candidate List Entries in the BSS Transition Management Request Frame.

By the processes described above, the wireless LAN terminal 33 receives, by single time communication, the BSS Transition Management Request Frame including the BSS Transition Candidate List Entries that include neighboring base station proposal information and in which the Neighbor Report elements of the wireless LAN base stations 32-1 and 32-2 are listed. Then, the wireless LAN terminal 33 acquires the event information and the base station information of each of the wireless LAN base stations 32. Then in the process in step S343, the wireless LAN terminal 33 can execute a base station selection process on the basis of position information of the own apparatus in addition to the acquired event information and base station information to select a wireless LAN base station 32 with which connection should be established.

As a result, unless there is a problem in the communication state, switching between a wireless LAN terminal 33 and a wireless LAN base station 32 is suppressed from being performed during execution of an event. Therefore, such a situation that communication is interrupted until a communication state is established again is eliminated, and it becomes possible to implement execution of an event smoothly.

Further, in the case where the communication state becomes worse during execution of an event until it becomes necessary to switch the wireless LAN base station 32, the connection to the wireless LAN base station 32 to which communication is established is cut first, and then connection to a wireless LAN base station 32 that is best in communication state is established. Therefore, the period of time in which communication is interrupted and which becomes an overhead during execution of an event can be minimized.

Furthermore, since base station information and event information of a neighboring wireless LAN base station 32 can be acquired by a single time of communication, it is possible to promptly implement a base station selection process and moderate congestion in communication.

It is to be noted that, in such a case that the number of wireless LAN terminals 33 connected to a specific wireless LAN base station 32 is so great that the wireless LAN terminal 33 takes into consideration distribution of communication according to a congestion situation of communication, a wireless LAN base station 32 proposed by the BSS Transition Management Request Frame is connected preferentially. This makes it possible to moderate congestion caused by concentration of communication. Further, by eliminating the base station selection process, higher speed processing can be implemented.

5. Fifth Embodiment

<Connection Switching Between Wireless LAN Base Station and Wireless LAN Terminal Using Beacon Frame, Probe Response Frame, Neighbor Report element, and BSS Transition Management Request Frame in Combination>

The foregoing description is directed to a connection switching process in which a wireless LAN terminal 33 in the case where it uses the Beacon Frame, Probe Response Frame, Neighbor Report element, and BSS Transition Management Request Frame individually such that they include the Application element selects a wireless LAN base station 32 with which the wireless LAN terminal 33 is to be connected.

However, the Beacon Frame, Probe Response Frame, Neighbor Report element, and BSS Transition Management Request Frame may be used in combination.

<Example of Configuration of Wireless LAN Base Station where Beacon Frame, Probe Response Frame, Neighbor Report element, and BSS Transition Management Request Frame are Used in Combination>

Figure 15:
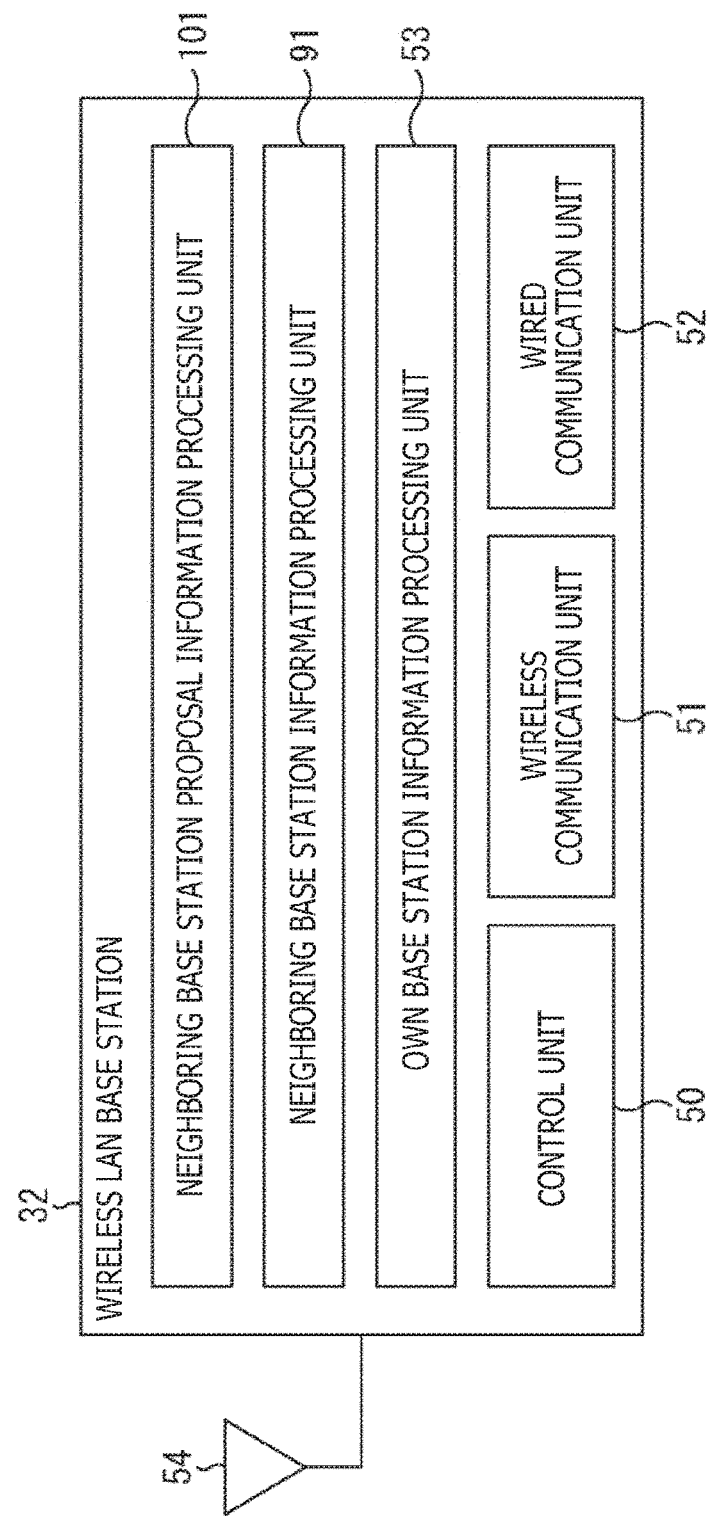
FIG. 15 is a view illustrating an example of a configuration of a fifth embodiment of the wireless LAN base station of the communication system of FIG. 1.

Now, an example of a configuration of the wireless LAN base station 32 in the case where the Beacon Frame, Probe Response Frame, Neighbor Report element, and BSS Transition Management Request Frame are used in combination is described with reference to FIG. 15. It is to be noted that, in the wireless LAN base station 32 of FIG. 15, components having the same functions as those of the wireless LAN base station 32 of FIG. 3 are denoted by the same reference signs and description of them is omitted.

In particular, the wireless LAN base station 32 of FIG. 13 is different from the wireless LAN base station 32 of FIG. 3 in that a neighboring base station information processing unit 91 and a neighboring base station proposal information processing unit 101 are provided. It is to be noted that, since both of them are the components described hereinabove with reference to FIGS. 10 and 13, description of them is omitted.

<Connection Switching Process where Beacon Frame, Probe Response Frame, Neighbor Report element, and BSS Transition Management Request Frame are Used in Combination>

Now, a connection switching process in the case where the Beacon Frame, Probe Response Frame, Neighbor Report element, and BSS Transition Management Request Frame are used in combination is described with reference to a flow chart of FIG. 16.

It is to be noted that, since processes in steps S411 to S413, S421, S425 to S427, S431, S435, and S444 to S448 of FIG. 16 are similar to the processes in steps S11 to S13, S21, S23 to S25, S31, S33, and S43 to S47 of FIG. 6, description of them is omitted.

In particular, by the processes in steps S411, S412, S421, and S431, event information corresponding to events generated individually in neighboring regions in which the base stations are installed individually is delivered to the wireless LAN base stations 32-1 and 32-2 existing in the same ESS.

Then, by a beacon frame or probe response (Beacon Frame or Probe Response Frame) process configured from steps S422, S432, and S441, the Beacon Frame or the Probe Response Frame is used to acquire event information and base station information by the wireless LAN terminal 33.

Figure 8:
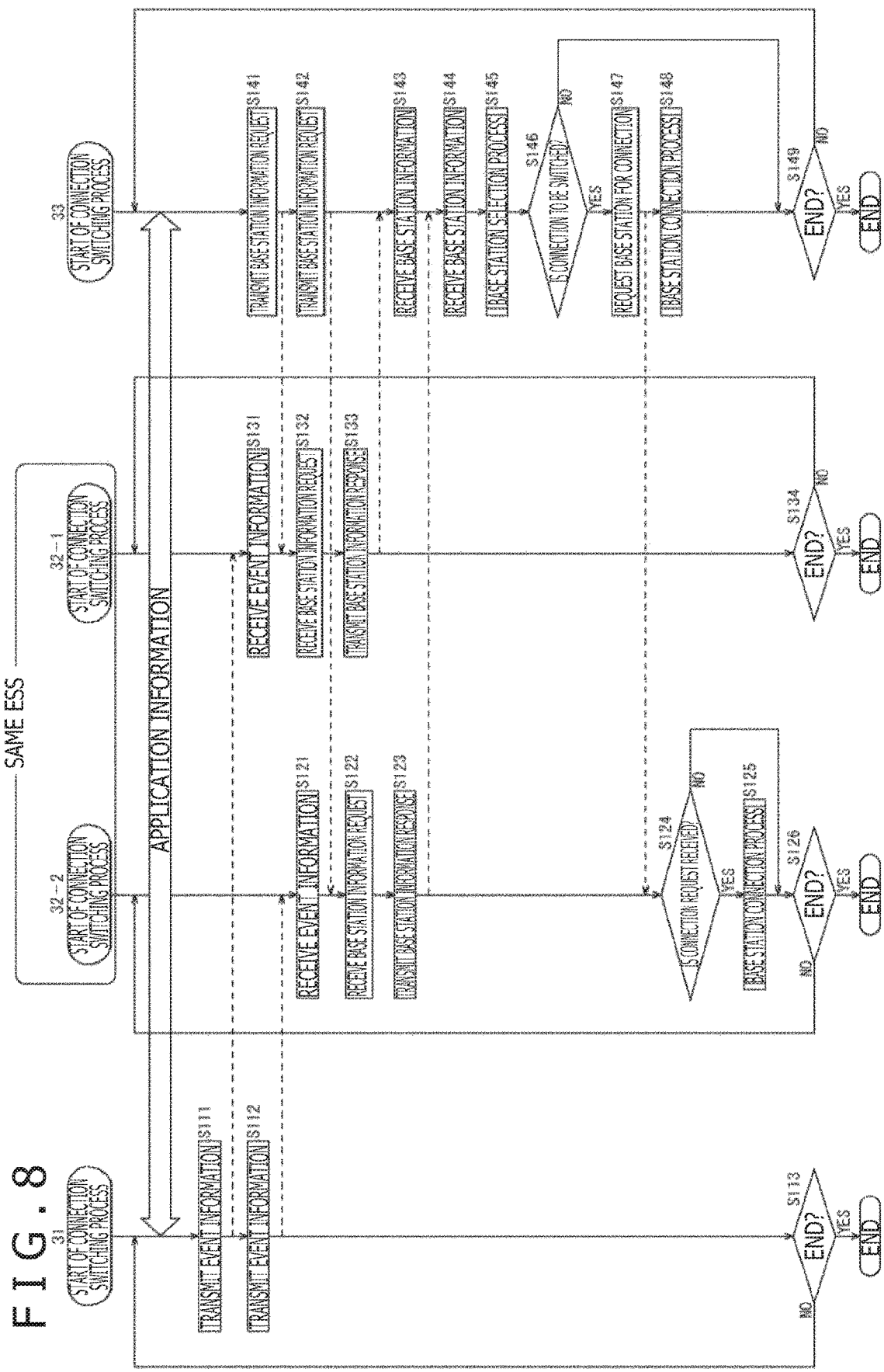
FIG. 8 is a flow chart illustrating a connection switching process using a Probe Response Frame.

It is to be noted that the process in step S422 corresponds to the process in step S22 of FIG. 6 or the processes in steps S122 and S123 of FIG. 8, and the process in step S432 corresponds to the process in step S32 of FIG. 6 or the processes in steps S132 and S133 of FIG. 8. The process in step S441 corresponds to the processes in steps S41 and S42 of FIG. 6 or in steps S141 to S144 of FIG. 8.

Further, by the neighboring base station information collection process configured from steps S423, S433, and S442, the Neighbor Report element is used to acquire event information and neighboring base station information by the wireless LAN terminal 33.

Figure 11:
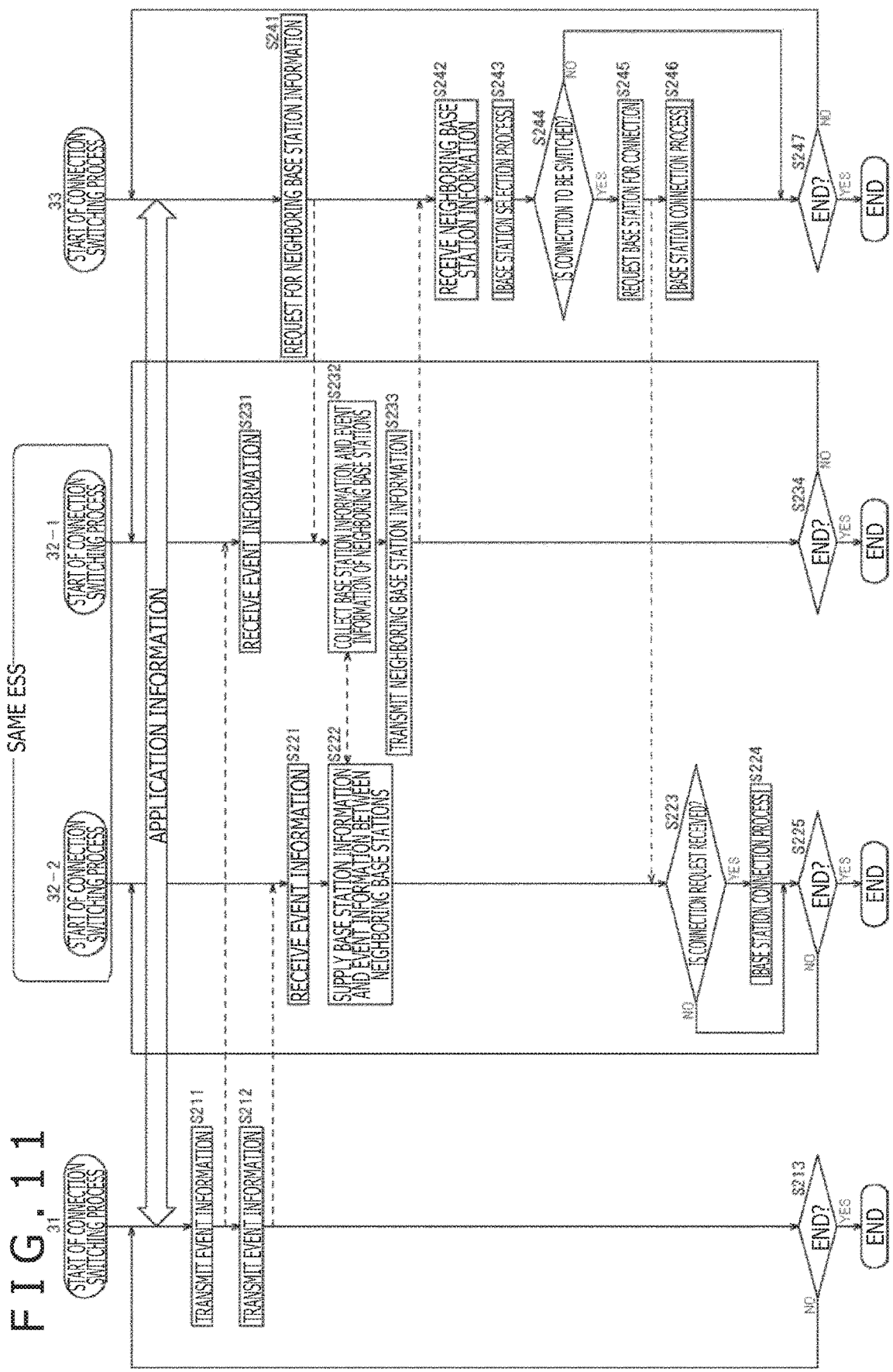
FIG. 11 is a flow chart illustrating a connection switching process using the Neighbor Report element.

It is to be noted that the process in step S423 corresponds to the process in step S222 of FIG. 11, and the process in step S433 corresponds to the processes in steps S232 and S233 of FIG. 11, and the process in step S442 corresponds to the processes in steps S241 and S242 of FIG. 11.

Further, by the neighboring base station proposal process configured from steps S424, S434, and S443, the BSS Transition Management Request Frame is used to acquire event information and neighboring base station proposal information by the wireless LAN terminal 33.

It is to be noted that the process in step S424 corresponds to the process in step S322 of FIG. 13, and the process in step S434 corresponds to the processes in steps S333 and S334 of FIG. 13, and the process in step S443 corresponds to the processes in steps S341 and S342 of FIG. 13.

As a result, in the wireless LAN terminal 33, the base station selection decision processing unit 75 can select a wireless LAN base station 32 with which connection should be established, on the basis of the base station information, neighboring base station information, and neighboring base station proposal information of the neighboring wireless LAN base stations 32.

It is to be noted that, while it is described that, in FIG. 16, the beacon frame or probe response process configured from steps S422, S432, and S441, neighboring base station information collection process configured from steps S423, S433, and S442, and neighboring base station proposal process configured from steps S424, S434, and S443 are repetitively executed in an equal frequency, the frequency of one of the processes may be increased while the frequency of any one of the processes is decreased.

In particular, since the beacon frame or probe response process configured from steps S422, S432, and S441 is repetitively executed normally at intervals of time of processing, this process may be executed in a comparatively high frequency while the neighboring base station information collection process configured from steps S423, S433, and S442 and the neighboring base station proposal process configured from steps S424, S434, and S443 are executed in a lower frequency than that of the beacon frame or probe response process.

In particular, in such a case as just described, the neighboring base station information collection process configured from steps S423, S433, and S442 and the neighboring base station proposal process configured from steps S424, S434, and S443 may be executed in a frequency of approximately m (<n) times within a period within which the beacon frame or probe response process configured from steps S422, S432, and S441 is executed repetitively by a predetermined number n of times. Further, the neighboring base station information collection process configured from steps S423, S433, and S442 and the neighboring base station proposal process configured from steps S424, S434, and S443 may be executed individually in frequencies different from each other.

6. Example of Execution by Software

While the series of processes described above can be executed by hardware, it can otherwise be executed by software. In the case where the series of processes is executed by software, a program that constructs the software is installed from a recording medium into a computer incorporated in hardware for exclusive use, a computer for universal use that can execute various functions by installing various programs into the computer or the like.

FIG. 17 depicts an example of a configuration of a computer for universal use. The personal computer has a CPU (Central Processing Unit) 1001 built therein. An input/output interface 1005 is connected to the CPU 1001 through a bus 1004. A ROM (Read Only Memory) 1002 and a RAM (Random Access Memory) 1003 are connected to the bus 1004.

To the input/output interface 1005, an inputting unit 1006 including an inputting device such as a keyboard or a mouse for allowing a user to input an operation command therethrough, an outputting unit 1007 that outputs a processing operation screen image or an image of a processing result to a display device, a storage unit 1008 including a hard disk drive for storing programs and various kinds of data therein or the like, and a communication unit 1009 that includes a LAN (Local Area Network) adapter or the like and executes a communication process through a network represented by the Internet are connected. Further, a drive 1010 for reading and writing data from and on a removable storage medium 1011 such as a magnetic disk (including a flexible disk), an optical disk (including a CD-ROM (Compact Disc-Read Only Memory) and a DVD (Digital Versatile Disc)), a magneto-optical disk (including an MD (Mini Disc)), or a semiconductor memory is connected.

The CPU 1001 executes various processes in accordance with a program stored in the ROM 1002 or a program read out from the removable storage medium 1011 such as a magnetic disk, an optical disk, a magneto-optical disk, a semiconductor memory or the like, installed in the storage unit 1008, and loaded from the storage unit 1008 in the RAM 1003. Further, in the RAM 1003, also data and so forth necessary for execution of various processes by the CPU 1001 are stored suitably.

In the computer configured in such a manner as described above, the CPU 1001 loads a program stored, for example, in the storage unit 1008 into the RAM 1003 through the input/output interface 1005 and the bus 1004 and executes the program to perform the series of processes described above.

The program to be executed by the computer (CPU 1001) can be recorded on and provided as a removable storage medium 1011 as, for example, a package medium. Also, it is possible to provide the program through a wired or wireless transmission medium such as a local area network, the Internet, or a digital satellite broadcast.

In the computer, the program can be installed into the storage unit 1008 through the input/output interface 1005 by mounting the removable storage medium 1011 on the drive 1010. Further, the program can be received by the communication unit 1009 through a wired or wireless transmission medium and installed into the storage unit 1008. Furthermore, the program can be installed in advance in the ROM 1002 or the storage unit 1008.

It is to be noted that the program to be executed by the computer may be a program in which processes are carried out in a time series in the order as described in the present specification or a program in which processes are executed in parallel or executed at necessary timings such as when the process is called.

Figure 2:
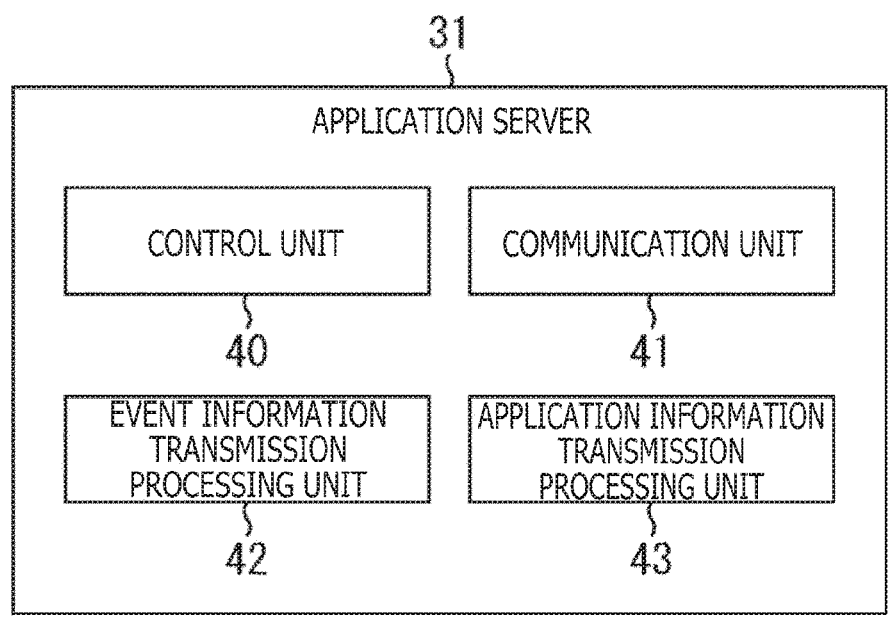
FIG. 2 is a view illustrating an example of a configuration of an application server of the communication system of FIG. 1.
Figure 4:
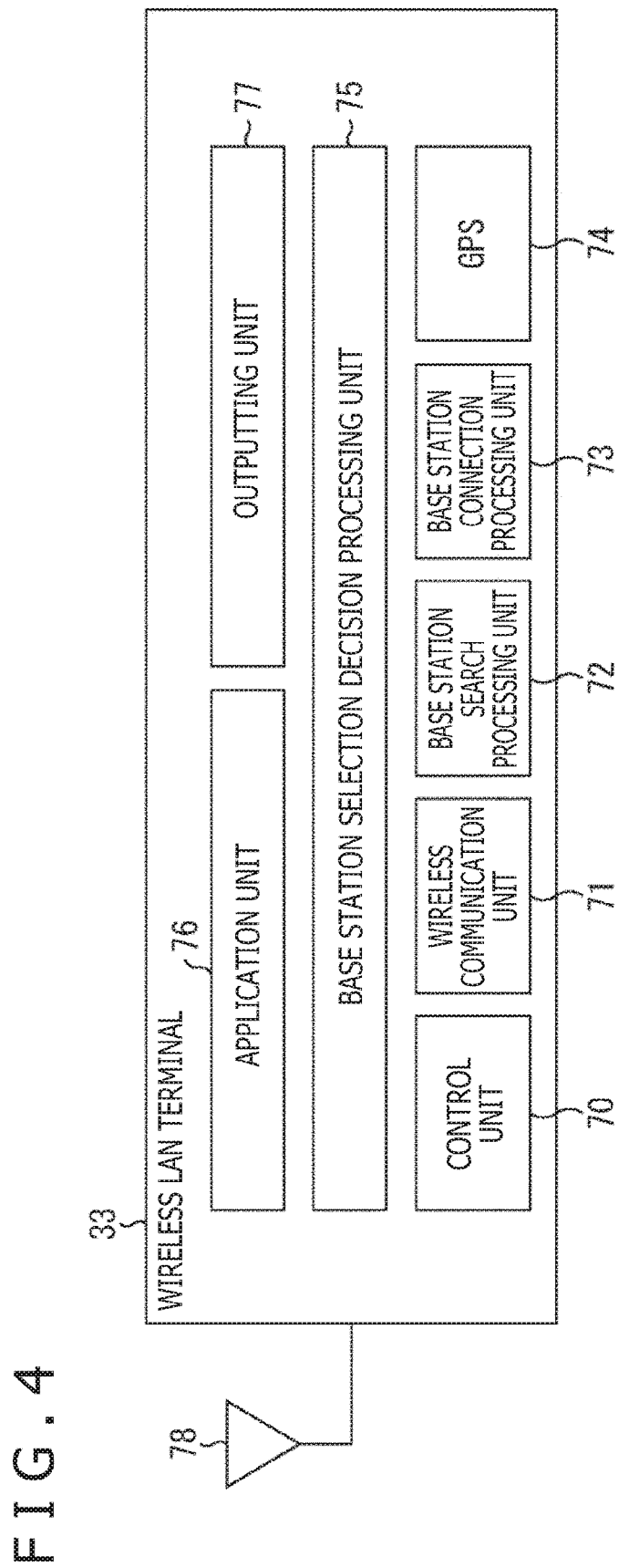
FIG. 4 is a view illustrating an example of a configuration of a wireless LAN terminal of the communication system of FIG. 1.

It is to be noted that the CPU 1001 in FIG. 17 implements the functions of the control unit 40 of FIG. 2, the control unit 50 in FIGS. 3, 10, 13, and 15, and the control unit 60 of FIG. 4.

Further, in the present specification, the term system is used to signify an aggregation of a plurality of components (devices, modules (parts) and so forth) and it does not matter whether or not all components are accommodated in the same housing. Accordingly, a plurality of apparatuses accommodated in separate housings and connected to each other through a network is a system, and also one apparatus in which a plurality of modules is accommodated in a single housing is a system.

It is to be noted that the embodiment of the present disclosure is not limited to the embodiments described hereinabove and allows various alterations without departing from the subject matter of the present disclosure.

For example, the present disclosure can take a configuration for cloud computing by which a plurality of apparatuses shares and cooperates to process one function through a network.

Further, each of the steps described hereinabove with reference to the flow charts can be executed by a single apparatus and also can be shared and executed by a plurality of apparatuses.

Further, in the case where a plurality of processes is included in one step, the plurality of processes included in the one step can be executed by one apparatus and also can be shared and executed by a plurality of apparatuses.

It is to be noted that the present disclosure can also take such configurations as described below.

<1>
A server apparatus, including:
an application information supplying unit configured to supply application information relating to an application program to be executed by a terminal apparatus to the terminal apparatus through a base station whose communication with the terminal apparatus is established; and
an event information supplying unit configured to supply event information, which is information relating to an event that is implemented by execution, by the terminal apparatus, of the application program supplied to the terminal apparatus through the base station installed at a predetermined position, to the base station installed at the predetermined position.

<2>
The server apparatus according to <1>, in which
the application program includes a game in which a virtual image is displayed in a superimposed relation with an image in a real space.

<3>
The server apparatus according to <2>, in which
the event information includes information for identifying a scene and a character in the game.

<4>
A base station, including:
a reception unit configured to receive, from a server apparatus, application information relating to an application program to be executed by a terminal apparatus and event information that is information relating to an event that is implemented by execution of the application program by the terminal apparatus; and
a transmission unit configured to transmit the application information, the event information, and base station information that is information relating to communication capability of the base station itself to the terminal apparatus.

<5>
The base station according to <4>, in which
the event information includes an identifier for identifying the application program and an identifier for identifying the event.
<6>
The base station according to <4> or <5>, in which
the transmission unit transmits the event information and the base station information, which are included in a Beacon Frame or a Probe Response Frame prescribed by IEEE 802.11, to the terminal apparatus.
<7>
The base station according to any one of <4> to <6>, in which
the transmission unit transmits the event information and the base station information, which are included in a Neighbor Report element prescribed by IEEE 802.11, to the terminal apparatus.
<8>
The base station according to <7>, in which
the transmission unit places and transmits the event information and the base station information as well as neighboring base station information including event information of another base station and base station information relating to the another base station into and together with a Neighbor Report element prescribed by IEEE 802.11 to the terminal apparatus.
<9>
The base station according to <8>, further including:
a neighboring base station information processing unit configured to collect, when a request for the neighboring base station information is received from the terminal apparatus, event information provided by the another base station and base station information relating to the another base station from the another base station and generate the neighboring base station information, in which
the transmission unit places and transmits the neighboring base station information generated by the neighboring base station information processing unit into and together with the Neighbor Report element prescribed by IEEE 802.11 to the terminal apparatus.
<10>
The base station according to any one of <4> to <9>, in which
the transmission unit places and transmits the event information and the base station information into and together with a BSS transition Management Request Frame prescribed by IEEE 802.11 to the terminal apparatus.
<11>
The base station according to <10>, in which
the transmission unit places and transmits the event information and the base station information as well as neighboring base station proposal information into and together with a BSS transition Management Request Frame prescribed by IEEE 802.11 to the terminal apparatus, the neighboring base station proposal information including neighboring base station information including event information of base stations and base station information relating to the base stations, the neighboring base station proposal information including information of a base station with respect to which establishment of connection is proposed from among the base stations on the basis of the neighboring base station information.
<12>
The base station according to <11>, further including:
a neighboring base station proposal information generation unit configured to collect, when a request for the neighboring base station proposal information is received from the terminal apparatus, event information provided by the another base station and base station information relating to the another base station from the another base station and generate the neighboring base station information and further generate the neighboring base station proposal information including information of a base station with respect to which establishment of connection is proposed from among the base stations on the basis of the neighboring base station information, in which
the transmission unit places and transmits the neighboring base station proposal information generated by the neighboring base station proposal information generation unit into and together with a BSS transition Management Request Frame prescribed by IEEE 802.11 to the terminal apparatus.
<13>
The base station according to any one of <4> to <12>, in which
the base station information includes information of a communication function of the base station and communication quality of the base station.
<14>
The base station according to <13>, in which
the information of the communication function of the base station includes information of an identifier for identifying the base station, a wireless band of the base station, an operation channel in the wireless band, and a supported security function, and
the information of the communication quality of the base station includes information of a reception signal strength (RSSI: Received Signal Strength Indicator) of the base station and a signal to noise ratio (SNR: Signal-to-Noise Ratio).
<15>
A terminal apparatus, including:
a reception unit configured to receive information supplied to the terminal apparatus from a server apparatus through a base station, the information including application information relating to an application program to be executed by the terminal apparatus itself, event information that is information relating to an event that is implemented by execution of the application program, and base station information that is information relating to communication capability of the base station; and
a selection unit configured to select a base station with which connection should be established next, on the basis of the event information and the base station information.
<16>
The terminal apparatus according to <15>, in which
the selection unit selects, where the event is being executed, a base station to which communication is currently established as the base station to which communication is to be established next and maintains the established communication.
<17>
The terminal apparatus according to <16>, in which
the selection unit selects, where the event is being executed, where communication quality of communication with the base station to which communication is currently established is degraded from a predetermined condition, or where the communication is interrupted, a base station capable of supplying application information relating to an event having been executed by communication with the base station whose communication quality is degraded or with which the communication is interrupted, as the base station to which communication is to be established next, on the basis of the event information and the base station information.

<18>

The terminal apparatus according to <15>, in which the selection unit selects, where the event is not being executed, a base station capable of supplying application information relating to a next event as a base station to which communication is to be established next, on the basis of the event information.

<19>

The terminal apparatus according to <18>, in which the selection unit extracts, where the event is not being executed, a base station capable of supplying application information relating to a next event as a candidate, on the basis of the event information and selects, and where the number of extracted base stations is a plural number, a base station to which communication is to be established as the base station to which communication is to be established next from among the plural base stations that become candidates, on the basis of the base station information.

<20>

A communication system including:

a server apparatus configured to supply application information relating to an application program to a terminal apparatus through a base station installed at a predetermined position;

the base station configured to receive the application information from the server apparatus and supply the application information to the terminal apparatus; and the terminal apparatus configured to execute the application program on the basis of the application information supplied from the base station, in which the server apparatus includes an application information supplying unit configured to supply the application information to the terminal apparatus through the base station, and an event information supplying unit configured to supply event information, which is information relating to an event implemented by execution of the application program by the terminal apparatus and is supplied to the terminal apparatus through the base station, to the base station, the base station includes a base station reception unit configured to receive the application information and the event information supplied from the server apparatus, and a base station transmission unit configured to transmit the application information, the event information, and base station information that is information relating to communication capability of the base station itself to the terminal apparatus, and the terminal apparatus includes a terminal reception unit configured to receive the application information, the event information, and the base station information supplied to the terminal apparatus from the base station, and a selection unit configured to select a base station to which communication is to be established next, on the basis of the event information and the base station information.

<21>

A control method for a server apparatus, including:

an application information supplying process of supplying application information relating to an application program to be executed by a terminal apparatus to the terminal apparatus through a base station whose communication with the terminal apparatus is established; and an event information supplying process of supplying event information, which is information relating to an event that is implemented by execution, by the terminal apparatus, of the application program supplied to the terminal apparatus through the base station installed at a predetermined position, to the base station installed at the predetermined position.

<22>

A control method for a base station, including:

a reception process of receiving, from a server apparatus, application information relating to an application program to be executed by a terminal apparatus and event information that is information relating to an event that is implemented by execution of the application program by the terminal apparatus; and a transmission process of transmitting the application information, the event information, and base station information that is information relating to communication capability of the base station itself to the terminal apparatus.

<23>

A control method for a terminal apparatus, including:

a reception process of receiving information supplied to the terminal apparatus from a server apparatus through a base station, the information including application information relating to an application program to be executed by the terminal apparatus itself, event information that is information relating to an event that is implemented by execution of the application program, and base station information that is information relating to communication capability of the base station; and a selection process of selecting a base station with which connection should be established next, on the basis of the event information and the base station information.

<24>

A program for causing a computer to function as:

a reception unit configured to receive information supplied thereto from a server apparatus through a base station, the information including application information relating to an application program to be executed by the terminal apparatus itself, event information that is information relating to an event that is implemented by execution of the application program, and base station information that is information relating to communication capability of the base station; and a selection unit configured to select a base station with which connection should be established next, on the basis of the event information and the base station information.

REFERENCE SIGNS LIST

11 Communication system, 31 Application server, 32, 32-1, 32-2 Wireless LAN base station, 33 Wireless LAN terminal, 40 Control unit, 41 Communication unit, 42 Event transmission processing unit, 43 Application information transmission processing unit, 50 Control unit, 51 Wireless communication unit, 52 Wired communication unit, 53 Own base station information processing unit, 54 Antenna, 71 Wireless communication unit, 72 Base station search processing unit, 73 Base station connection processing unit, 74 GPS, 75 Base station selection decision processing unit, 76 Application unit, 77 Outputting unit, 78 Antenna, 91 neighboring base station information processing unit, 101 Neighboring base station proposal information processing

The invention claimed is:

1. A server apparatus, comprising:
   circuitry configured to:
   supply, to a terminal apparatus, application information relating to an application program executed by the terminal apparatus, wherein the application information is supplied to the terminal apparatus through a first base station that is in communication with the terminal apparatus;
   supply, to the first base station, event information relating to a first event, wherein the first event is implemented by the execution of the application program by the terminal apparatus; and
   supply, to a second base station, event information relating to a second event different from the first event, wherein
   the second event is implemented by the execution of the application program by the terminal apparatus, and
   the second base station is at a position different from a position of the first base station.

2. The server apparatus according to claim 1, wherein the application program includes a game that displays a virtual image in a superimposed relation with an image in a real space.

3. The server apparatus according to claim 2, wherein each of the event information relating to the first event and the event information relating to the second event includes information to identify a scene in the game and a character in the game.

4. A first base station, comprising:
   circuitry configured to:
   receive, from a server apparatus, application information relating to an application program executed by a terminal apparatus and first event information relating to an event that is implemented by the execution of the application program;
   transmit the application information to the terminal apparatus; and
   transmit a first Neighbor Report element prescribed by IEEE 802.11 to the terminal apparatus, wherein
   the first Neighbor Report element includes the first event information and first base station information, and
   the first base station information is information relating to communication capability of the first base station.

5. The first base station according to claim 4, wherein the first event information includes an identifier to identify the application program and an identifier to identify the event.

6. The first base station according to claim 4, wherein the circuitry is further configured to transmit, to the terminal apparatus, at least one of a Beacon Frame prescribed by IEEE 802.11 or a Probe Response Frame prescribed by IEEE 802.11, and
the at least one of the Beacon Frame or the Probe Response Frame includes the first event information and the first base station information.

7. The first base station according to claim 4, wherein the circuitry is further configured to:
   place neighboring base station information including second event information of a second base station and second base station information relating to the second base station into a second Neighbor Report element prescribed by IEEE 802.11; and
   transmit the second Neighbor Report element together with the first Neighbor Report element to the terminal apparatus.

8. The first base station according to claim 7, wherein the circuitry is further configured to:
   receive, from the terminal apparatus, a request for the neighboring base station information;
   collect, based on the received request, the second event information and the second base station information from the second base station;
   generate the neighboring base station information based on the second event information and the second base station information;
   place the generated neighboring base station information into the second Neighbor Report element; and
   transmit the second Neighbor Report element together with the first Neighbor Report element to the terminal apparatus.

9. The first base station according to claim 4, wherein the circuitry is further configured to:
   place the first event information and the first base station information into a BSS transition Management Request Frame prescribed by IEEE 802.11; and
   transmit the BSS transition Management Request Frame to the terminal apparatus.

10. The first base station according to claim 9, wherein the circuitry is further configured to:
    place the first event information, the first base station information, and neighboring base station proposal information into the BSS transition Management Request Frame prescribed by IEEE 802.11; and
    transmit the BSS transition Management Request Frame to the terminal apparatus,
    the neighboring base station proposal information includes neighboring base station information including second event information of a plurality of base stations and second base station information relating to the plurality of base stations,
    the first base station is different from the plurality of base stations, and
    the neighboring base station proposal information further includes information of a second base station with respect to which establishment of connection is proposed from among the plurality of base stations based on the neighboring base station information.

11. The first base station according to claim 10, wherein the circuitry is further configured to:
    receive a request for the neighboring base station proposal information from the terminal apparatus;
    collect, based on the received request, the second event information and the second base station information from the plurality of base stations;
    generate the neighboring base station information based on the second event information and the second base station information;
    generate, based on the neighboring base station information, the neighboring base station proposal information including the information of the second base station with respect to which the establishment of the connection is proposed from among the plurality of base stations;
    place the generated neighboring base station proposal information into the BSS transition Management Request Frame; and
    transmit the BSS transition Management Request Frame to the terminal apparatus.

12. The first base station according to claim 4, wherein the first base station information includes information of a communication function of the first base station and information of a communication quality of the first base station.

13. The first base station according to claim 12, wherein
the information of the communication function of the first base station includes information of an identifier to identify the first base station, information of a wireless band of the first base station, information of an operation channel in the wireless band, and information of a supported security function, and
the information of the communication quality of the first base station includes information of a reception signal strength (RSSI: Received Signal Strength Indicator) of the first base station and information of a signal to noise ratio (SNR: Signal-to-Noise Ratio).

14. A terminal apparatus, comprising:
circuitry configured to:
receive, from a server apparatus through a first base station, information including:
application information relating to an application program executed by the terminal apparatus,
first event information relating to an event that is implemented by the execution of the application program, and
base station information relating to communication capability of the first base station; and
select, based on the first event information and the base station information, a second base station with which a connection is to be established.

15. The terminal apparatus according to claim 14, wherein the circuitry is further configured to:
select, based on execution of the event, the first base station to which communication is currently established as the second base station; and
maintain the established communication.

16. The terminal apparatus according to claim 15, wherein the circuitry is further configured to select a third base station as the second base station based on
the first event information,
the base station information, and
at least one of the execution of the event, a communication quality of the communication with the first base station that is degraded from a specific condition, or the communication that is interrupted, and
the third base station is capable of supplying the first event information relating to the event executed by the communication with the first base station.

17. The terminal apparatus according to claim 14, wherein in a case where the event is not executed, the circuitry is further configured to select, based on the first event information, a third base station capable of supplying second event information relating to a next event as the second base station.

18. The terminal apparatus according to claim 17, wherein the circuitry is further configured to:
in the case where the event is not executed, extract, based on the first event information, the third base station capable of supplying the second event information relating to the next event as a candidate; and
in a case where a number of extracted base stations is a plural number, select, based on the base station information, the third base station as the second base station from among the extracted base stations that become candidates.

19. A communication system, comprising:
a server apparatus including first circuitry configured to supply application information relating to an application program to a terminal apparatus through a first base station, wherein the first base station is at a specific position;
the first base station including second circuitry configured to:
receive the application information from the server apparatus; and
supply the application information to the terminal apparatus; and
the terminal apparatus including third circuitry configured to execute the application program based on the application information supplied from the first base station, wherein
the first circuitry is further configured to supply event information relating to an event implemented by the execution of the application program to the first base station,
the second circuitry is further configured to:
receive the event information supplied from the server apparatus; and
transmit the event information and base station information to the terminal apparatus, wherein the base station information is information relating to communication capability of the first base station, and
the third circuitry is further configured to:
receive the event information and the base station information from the first base station; and
select, based on the event information and the base station information, a second base station to which communication is to be established.

20. A base station, comprising:
circuitry configured to:
receive, from a server apparatus, application information relating to an application program executed by a terminal apparatus and event information relating to an event that is implemented by the execution of the application program;
transmit the application information to the terminal apparatus;
place the event information and base station information into a BSS transition Management Request Frame prescribed by IEEE 802.11, wherein the base station information is information relating to communication capability of the base station; and
transmit the BSS transition Management Request Frame to the terminal apparatus.

* * * * *